US011164263B1

(12) United States Patent
Lyons et al.

(10) Patent No.: US 11,164,263 B1
(45) Date of Patent: *Nov. 2, 2021

(54) PROVIDING DATA ASSOCIATED WITH INSURED LOSSES

(71) Applicant: STATE FARM MUTUAL AUTOMOBILE INSURANCE COMPANY, Bloomington, IL (US)

(72) Inventors: Roxane Lyons, Chenoa, IL (US); John H. Jenkins, Bloomington, IL (US); Brian N. Harvey, Bloomington, IL (US); Amber L. Wyatt, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/863,748

(22) Filed: Apr. 30, 2020

Related U.S. Application Data

(63) Continuation of application No. 15/398,422, filed on Jan. 4, 2017, now Pat. No. 10,672,081.

(51) Int. Cl.
*G06Q 40/08* (2012.01)
*G06K 9/00* (2006.01)

(52) U.S. Cl.
CPC ......... *G06Q 40/08* (2013.01); *G06K 9/00637* (2013.01)

(58) Field of Classification Search
CPC .......................... G06Q 40/08; G06K 9/00637

USPC ........................................................... 705/4
See application file for complete search history.

(56) References Cited

U.S. PATENT DOCUMENTS

| 8,650,106 | B1 * | 2/2014 | Hopkins, III | ......... G06Q 40/08 |
| | | | | 705/35 |
| 10,062,118 | B1 * | 8/2018 | Bernstein | ............... G06Q 40/08 |
| 2014/0195275 | A1 * | 7/2014 | Pershing | ................ C01B 21/28 |
| | | | | 705/4 |
| 2014/0245210 | A1 * | 8/2014 | Battcher | ................. G01S 13/95 |
| | | | | 715/771 |

* cited by examiner

*Primary Examiner* — Alexander G Kalinowski
*Assistant Examiner* — Liz P Nguyen
(74) *Attorney, Agent, or Firm* — Marshall, Gerstein & Borun LLP

(57) ABSTRACT

A computer-implemented method for providing data associated with insured losses is presented. Data regarding an event that is a cause of the insured losses may be received. Respective indications of locations of properties insured by an insurance provider and sustaining the insured losses may be received. Image data from at least one image capturing device, where the image data is obtained from an aerial view of the properties and indicative of respective conditions of the properties, may be received. The image data may be processed to determine, for each property, an indication of the respective condition. The data associated with the insured losses may be provided via a user interface. The data associated with the insured losses may include (i) the respective indications of the locations of the properties, and (ii) the indications of the respective conditions of the properties.

17 Claims, 11 Drawing Sheets

PROVIDING DATA ASSOCIATED WITH INSURED LOSSES

CROSS-REFERENCE TO RELATED APPLICATIONS

This application is a continuation of U.S. patent application Ser. No. 15/398,422, filed Jan. 4, 2017, and incorporated by reference herein in its entirety.

FIELD OF THE DISCLOSURE

The present disclosure generally relates to providing data associated with insured property, and more particularly, to a system and method for providing data associated with insured losses.

BACKGROUND

Existing techniques for coordinating a response of an insurance provider to a storm primarily involve representatives of the insurance provider accessing online weather maps to track the storm, and assessing damage after the storm. Frequently, to assess damage, initial claims data is reviewed in conjunction with reports from representatives who are at the site of the storm damage. Based on such information, representatives and other resources are deployed. Unfortunately, the site of storm damage may be physically inaccessible for some time after the storm, and initial claims data may be inaccurately reported by insured parties.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method for providing data associated with insured losses may be provided. The method may include receiving, using one or more processors, data regarding an event that is a cause of the insured losses. The method may also include receiving, using the one or more processors, for each of a plurality of properties insured by an insurance provider, a respective indication of a location of the property. The plurality of properties may sustain the insured losses. The method may also include receiving, from at least one image capturing device, image data obtained from an aerial view of the plurality of properties. The image data may be indicative, for each of the plurality of properties, of a respective condition of the property after the property sustains a respective one or more of the insured losses. The method may additionally include processing, using the one or more processors, the image data received from the at least one image capturing device to determine, for each of the plurality of properties, an indication of the respective condition of the property after the property sustains the respective one or more of the insured losses. The method may further include providing, using the one or more processors via a user interface, the data associated with the insured losses. The data associated with the insured losses may include (i) the respective indications of the locations of each of the plurality of properties, and (ii) the indications of the respective conditions of each of the plurality of properties after the plurality of properties sustains the insured losses.

In another embodiment, a computing device for providing data associated with insured losses may be provided. The computing device may include one or more processors and one or more memories coupled to the one or more processors. The one or more memories may include non-transitory computer executable instructions stored therein that, when executed by the one or more processors, cause the one or more processors to receive data regarding an event that is a cause of the insured losses. The non-transitory computer executable instructions, when executed by the one or more processors, may also cause the one or more processors to receive, for each of a plurality of properties insured by an insurance provider, a respective indication of a location of the property, where the plurality of properties sustain the insured losses. The non-transitory computer executable instructions, when executed by the one or more processors, may also cause the one or more processors to receive, from at least one image capturing device, image data obtained from an aerial view of the plurality of properties. The image data may be indicative, for each of the plurality of properties, of a respective condition of the property after the property sustains a respective one or more of the insured losses. The non-transitory computer executable instructions, when executed by the one or more processors, may additionally cause the one or more processors to process the image data received from the at least one image capturing device to determine, for each of the plurality of properties, an indication of the respective condition of the property after the property sustains the respective one or more of the insured losses. The non-transitory computer executable instructions, when executed by the one or more processors, may further cause the one or more processors to provide, via a user interface, the data associated with the insured losses. The data associated with the insured losses may include (i) the respective indications of the locations of each of the plurality of properties, and (ii) the indications of the respective conditions of each of the plurality of properties after the plurality of properties sustains the insured losses.

In yet another embodiment, a computer readable storage medium may be provided that includes non-transitory computer readable instructions stored thereon for providing data associated with insured losses. The instructions, when executed by one or more computing devices, may cause the one or more computing devices to receive data regarding an event that is a cause of the insured losses. The instructions, when executed by the one or more computing devices, may also cause the one or more computing devices to receive, for each of a plurality of properties insured by an insurance provider, a respective indication of a location of the property, where the plurality of properties sustains the insured losses. The instructions, when executed by the one or more computing devices, may also cause the one or more computing devices to receive, from at least one image capturing device, image data obtained from an aerial view of the plurality of properties. The image data may be indicative, for each of the plurality of properties, of a respective condition of the property after the property sustains a respective one or more of the insured losses. The instructions, when executed by the one or more computing devices, may additionally cause the one or more computing devices to process the image data received from the at least one image capturing device to determine, for each of the plurality of properties, an indication of the respective condition of the property after the property sustains the respective one or more of the insured losses. The instructions, when executed by the one or more computing devices, may further cause the one or more computing devices to provide, via a user interface, the data associated with the insured losses. The data associated with the insured losses may include (i) the respective indications of the locations of each of the plurality of properties, and (ii) the indications of the respective conditions of each of the plurality of properties after the plurality of properties sustains the insured losses.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
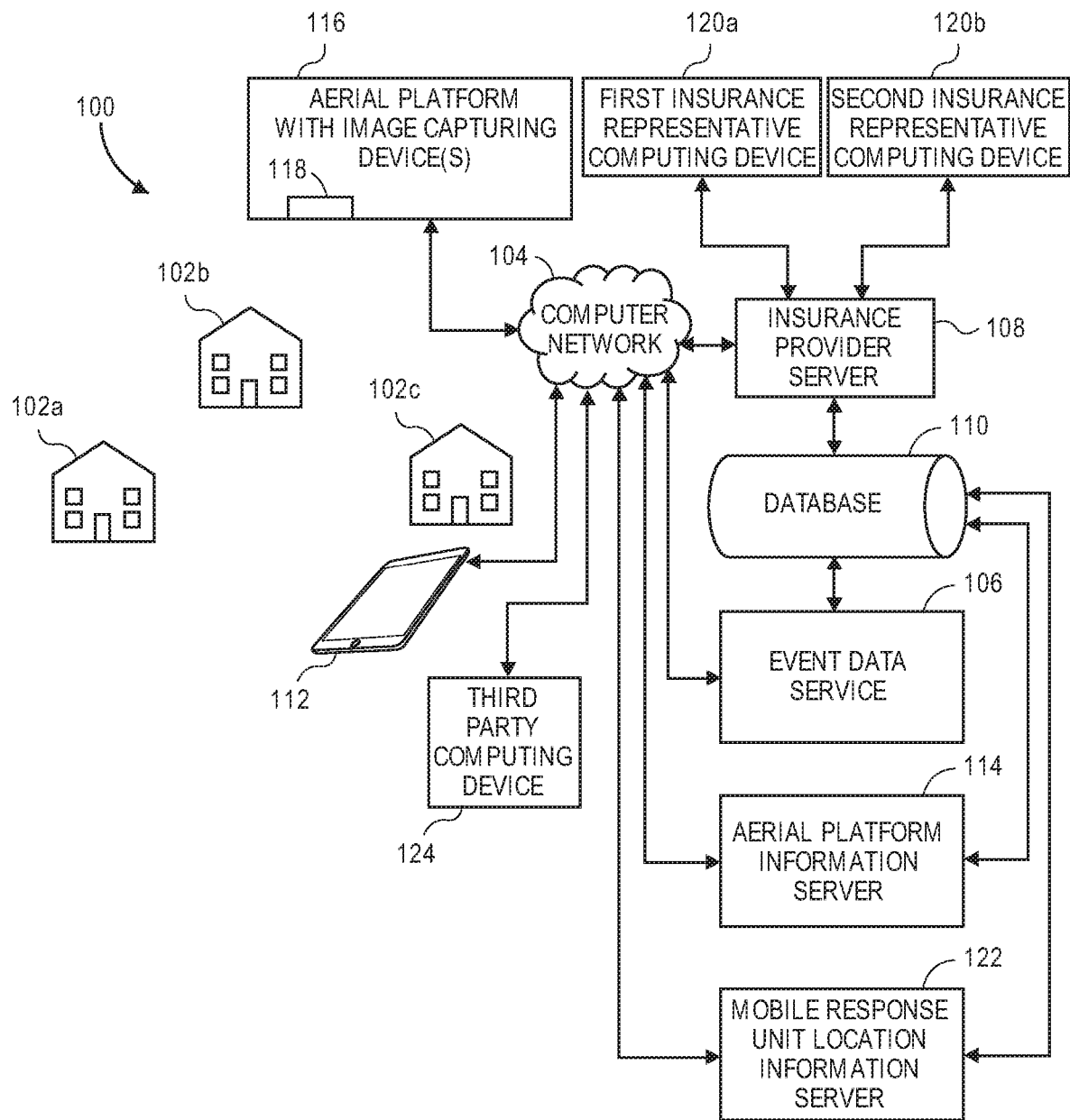
FIG. 1 illustrates an example system for providing data associated with insured losses.

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

I. Example Providing of Data Associated with Insured Losses

The present embodiments relate to, inter alia, a system and method for providing data associated with insured losses, such as data associated with insured losses to residential properties. More particularly, data regarding an event (e.g., a storm such as a hurricane, flood, tornado, etc.) that is a cause of the insured losses may be received, such as by one or more processors executing suitable non-transitory computer readable instructions. In some embodiments, the data regarding the event may be weather data, such as weather data obtained using a weather alert application programming interface (API). In one example, an insurance provider that utilizes the one or more processors may use the IBM® Weather Alerts for Insurance API provided by International Business Machines Corporation of Armonk, N.Y. The data regarding the event, such as weather data, may instead be received in any similar or otherwise suitable manner. The data regarding the event may indicate a path of the event (e.g., storm), which may be displayed on a map provided as part of the data associated with the insured losses.

In some embodiments, one or more notifications associated with the event may be caused (e.g., using the one or more processors) to be sent to one or more insured parties before the event (e.g., before the storm arrives at a geographic location(s) of properties, such as homes, of the one or more insured parties). For example, the one or more notifications may be pushed from an insurance provider server to mobile computing devices of the one or more insured parties to alert the one or more insured parties of the approaching storm or other event having the potential to cause an insured loss. The one or more notifications may be sent to the one or more insured parties based on the received data regarding the event (e.g., which may include data indicative of a current location of a storm) and based on an indication(s) of the location(s) of the property or properties of the one or more insured parties.

For each of a plurality of properties insured by the insurance provider and sustaining the insured losses, a respective indication of a location of the property may be received. Image data may also be obtained from at least one image capturing device from an aerial view of the plurality of properties, where the image data may be indicative, for each of the plurality of properties, of a respective condition of the property after the property sustains a respective one or more of the insured losses (e.g., as a result of the storm passing over and/or through the property).

In some embodiments, it may be determined whether to receive/obtain the image data using one of a manned aircraft, a satellite, or an unmanned aircraft system (UAS). Such a determination may be based on, for example, at least one of a type of the event, a time specified (e.g., by a representative of the insurance provider) for receipt of the image data, or actual and/or expected weather conditions at one or more of the plurality of properties (e.g., expected weather conditions during a period of time, such as a period of time including the time for which receipt of the image data is specified and/or time before the time for which receipt of the image data is specified, etc.).

The image data from the at least one image capturing device may be processed to determine, for each of the plurality of properties, an indication of the respective condition of the property after the property sustains the respective one or more of the insured losses. The processing of the image data may in some examples include processing the image data to determine an indication of a similarity of the image data to previous image data (e.g., stored image data associated with a previous storm) indicative of at least one previous property condition after a previously sustained insured loss (e.g., at least one property condition after such a previous storm).

The data associated with the insured losses may be provided, via a user interface, such as to representatives of the insurance provider that coordinate the response of the insurance provider to the storm or other event. The data associated with the insured losses may include, for example, (i) the respective indications of the locations of each of the plurality of properties sustaining the insured losses, and (ii) the indications of the respective conditions of each of the plurality of properties after the plurality of properties sustains the insured losses.

In some embodiments, the data associated with the insured losses may include map data indicative of a map view of the plurality of properties. The data associated with the insured losses may also or alternatively indicate first and second numbers of the plurality of properties that, generally speaking, indicate numbers of properties that have sustained a particular level or category of damage from the storm or other event.

In some embodiments, the data associated with the insured losses may include at least one of an enlarged view of one or more of the plurality of properties before and/or after the event, property data (e.g., address, size, number of bedrooms, number of bathrooms, etc.) regarding the one or more of the plurality of properties, data regarding one or more insured parties (e.g., name, contact information, etc.) associated with (e.g., owning) the one or more of the plurality of properties, data regarding one or more agents (e.g., name, contact information, etc.) of the insurance provider associated with the one or more of the plurality of properties (e.g., assigned as the agent for policies issued for the one or more of the plurality of properties), or data regarding one or more insurance policies (e.g., name and/or contact information of insured party, insurance policy terms, etc.) issued by the insurance provider with respect to the one or more of the plurality of properties. Additionally or alternatively, in some embodiments, at least a portion of the data associated with the insured losses may be provided via an additional user interface accessible by the one or more agents of the insurance provider so as to allow the agent(s) to see such data in addition to allowing representatives of the insurance provider directly coordinating a response to the event to see such data.

In some embodiments, based on the data associated with the insured losses, funds may be provided to or on behalf of an insured party; information may be provided to the insured party regarding filing a claim; information may be provided to the insured party regarding a location of a mobile response unit deployed by the insurance provider; and/or information may be provided to the insured party via an additional user interface regarding a condition of property of the insured party (e.g., so the insured party may remotely monitor, via the additional user interface, such condition of the property).

In some embodiments, data may be received (e.g., from a database, such as a database including map data) regarding a plurality of locations configured to accommodate one or more mobile response units of the insurance provider (e.g., large stores, churches or schools, and/or other areas, with, for example, ample parking lot space to accommodate, for example, a catastrophe mobile unit). One or more of the plurality of locations may be determined as a location(s) to which to deploy the one or more mobile response units based on at least one of the data regarding the plurality of locations, the data associated with the insured losses, or a user input (e.g., a user selection(s) of one or more of the plurality of locations).

In some embodiments, based on the data associated with the insured losses, at least one of an insurance provider reserve setting associated with the event or data associated with dispatching of representatives of the insurance provider to at least one location associated with the event (e.g., at least one damaged property) may be determined.

By providing a system and method that utilize, among other things, data regarding a storm or other event that causes insured losses; indications of locations of properties; and image data and results of processing thereof that indicate conditions of properties after the storm or other event to provide data associated with insured losses via a user interface, among other features, various advantages are achieved. For example, the storm or other event may be tracked before the storm reaches the locations of properties; the potential for damage to the properties may thus be understood before the storm reaches the locations of the properties; actual damage to the properties may be readily assessed using the image information when, for example, the damaged area(s) is/are inaccessible (e.g., because the image data may be obtained from an aerial view of the properties); and appropriate indications of damaged properties, locations of such properties, etc. may be provided to facilitate appropriate deployment of resources. The systems and methods described herein thus provide an integrated platform for pre-event planning through post-event response, and improve previous computerized functionality that provided some pre-event monitoring and relied heavily on initial loss or claims reporting by policyholders and accessibility of an area(s) of damage in order for determinations to be made regarding a response to the event. Other advantages will be recognized by one of ordinary skill in the art in light of the teaching and disclosure herein.

II. Example System and Related Functionality

FIG. 1 illustrates an example system 100 for providing data associated with insured losses (e.g., total or partial destruction of insured residential properties such as houses, condominiums, apartments, etc., such as destruction resulting from a storm, weather event, or other insured event). The example system 100 may include a plurality of properties, shown in the example of FIG. 1 as a first property 102*a*, a second property 102*b*, and a third property 102*c*; a computer network 104; an event data service 106; an insurance provider server 108; a database 110; an insured party mobile computing device 112; an aerial platform information server 114; an aerial platform 116 with at least one image capturing device, shown in the example of FIG. 1 as at least one image capturing device 118; a plurality of insurance representative computing devices, shown in the example of FIG. 1 as a first insurance representative computing device 120*a* and a second insurance representative computing device 120*b*; a mobile response unit location information server 122; and a third party computing device 124.

The plurality of properties 102 may be a plurality of residential properties, such as a plurality of houses, townhouses, condominiums, etc. The event data service 106 may in some embodiments be a server that provides weather data associated with particular locations, so as to allow, for example, the insurance provider server 108 to receive weather data associated with locations of the plurality of properties 102. In some embodiments, the event data service 106 may be a computing device(s) or service(s) that provides (e.g., to the insurance provider server 108) weather data obtained using a weather alert API, such as the IBM® Weather Alerts for Insurance API or obtained in a similar or otherwise suitable manner. The insurance provider server 108 may be a server of or associated with an insurance provider (e.g., provided or used by an insurance provider, or use of which the insurance provider otherwise controls or facilitates). The insurance provider may be associated with the plurality of properties 102. For example, the insurance provider may be associated with the plurality of properties 102 because a prospective purchaser(s) of one or more of the plurality of properties 102 may apply for insurance coverage for the one or more properties from the insurance provider, and/or because an owner(s) of one or more of the plurality of properties 102 may already have insurance coverage for the one or more properties 102 from the insurance provider.

The database 110 may store data relating to parties insured by the insurance provider associated with the insurance provider server 108, such as insured party identification data (e.g., insured party names and contact information); property identification data (e.g., property addresses); data regarding the event that may be received from the event data service 106; image data obtained from an aerial view of the plurality of properties 102 (e.g., after the event); data associated with the insured losses; and/or other suitable data described herein. The information stored in the database 110 may be retrieved by, for example, the insurance provider server 108, the aerial platform information server 114, the mobile response unit location information server 122, and/or any other suitable computing device(s), and thus the database 110 may be communicatively coupled to such devices as shown in the example of FIG. 1. In some embodiments, various example types of data described above may be stored in another suitable location, such as in a further database (not shown) communicatively coupled to the insurance provider server 108. The database 110 may be any suitable database(s) or data storage mechanism(s) (e.g., one or more hard disk drives, optical storage drives, solid state storage devices, etc.).

The insured party mobile computing device 112 may be any suitable mobile computing device of an insured party (e.g., an owner of one of the plurality of properties 102) that may, for example, allow the insured party to receive one or more notifications associated with the event; allow the insured party to access information regarding filing a claim with the insurance provider, a location(s) of a mobile response unit(s) deployed by the insurance provider, a condition of the one of the plurality of properties 102 owned by the insured party, etc.; and/or may allow the insured party to receive and or provide any other suitable information to, for example, the insurance provider server 108. The insured party mobile computing device 112 may be any suitable computing device, such as but not limited to a smart phone, other mobile phone, a tablet, a phablet, smart glasses, other wearable computing device(s), etc.

The aerial platform information server 114 may, in some embodiments, store and/or provide information regarding types of aerial platforms available to capture the image information of the plurality of properties 102 after the event as described herein. Additionally or alternatively, the aerial platform information server 114 may be used in determining a type of aerial platform (e.g., manned aircraft, satellite, or UAS) recommended for use in capturing the image information.

The aerial platform 116 with the at least one image capturing device 118 may be or may include, for example, a manned aircraft, a satellite, and/or a UAS, with the manned aircraft, satellite, and/or UAS including at least one camera or other suitable image capturing device as the at least one image capturing device 118. The at least one image capturing device 118 may be configured and/or oriented on and/or in the aerial platform 116 so that the at least one image capturing device 118 receives image data obtained from an aerial view of the plurality of properties 102, as further described below.

Each of the plurality of insurance representative computing devices 120 (e.g., the first insurance representative computing device 120*a* and the second insurance representative computing device 120*b*) may be used for any suitable purpose or purposes, such as inputting data used to determine a type of aerial platform for use in capturing the aforementioned image information; providing map data to representatives of the insurance provider showing damage to, for example, one or more of the plurality of properties 102; providing and/or determining data regarding a location(s) of a mobile response unit(s) of the insurance provider, such as providing such data to representatives of the insurance provider; providing data regarding individual insured parties (e.g., owners of individual ones of the plurality of properties 102) to insurance agents of the insurance provider; and/or providing any other suitable data to and/or receiving any other suitable data from a representative of the insurance provider, where the representative may be, for example, a representative at a main office of the insurance provider tasked with coordinating a response to the event, an agent of the insurance provider who primarily interacts directly with insured parties, a representative of the insurance provider located at a mobile response unit, etc.

The mobile response unit location information server 122 may be, for example, any suitable computing device that includes data regarding one or more locations configured to accommodate one or more mobile response units of the insurance provider, as discussed above and further discussed below. The third party computing device 124 may be, for example, a computing device of a vendor that provides goods or services to the insured party before, during, or after the event, such as a computing device of a hotel that the insured party stays at when one of the plurality of properties 102 owned by the insured party is a total loss or temporarily uninhabitable as a result of the event (e.g., storm). In some embodiments, as further described below, the insurance provider may, for example, directly pay the hotel for the stay of the insured party. For example, the insurance provider server 108 may cause payment to be made to the hotel via suitable communication with the third party computing device 124 of the hotel (the hotel being a third party with respect to the insurance provider and the insured party) by way of the computer network 104. Additionally or alternatively, as further discussed below, the insurance provider may directly pay living expenses to the insured party (e.g., by electronic funds transfer directly to an account (e.g., bank account or other account maintained with the insurance provider) of the insured party).

The computer network 104 may be or may include a computer network of the insurance provider (e.g., provided or used by the insurance provider or communications over which the insurance provider otherwise controls or facilitates). In various embodiments, processors of the devices communicatively coupled to the computer network 104 may execute instructions to transmit data to, receive data from, or otherwise communicate with other ones of the devices communicatively coupled to the computer network 104, as further described below. The computer network 104 may be or may include a network such as the Internet and/or any other type of suitable network (e.g., a local area network (LAN), a metropolitan area network (MAN), a wide area network (WAN), a mobile network, a wired or wireless network, a private network, a virtual private network, etc.). The computer network 104 may also or alternatively be or include one or more cellular networks such as code division multiple access (CDMA) network, GSM (Global System for Mobile Communications) network, WiMAX (Worldwide Interoperability for Microwave Access) network, Long Term Evolution (LTE) network, etc.

Although the example system 100 is shown as including one or multiple instances of various components therein (e.g., three properties 102a-102c, one computer network 104, one insurance provider server 108, two insurance representative computing devices 120a and 120b, etc.), the example system 100 may include more or fewer instances of one or more components therein. In some cases, the example system 100 may not include one or more of the components illustrated in FIG. 1. For example, in one embodiment, the functionality provided by the aerial platform information server 114 may be provided by the insurance provider server 108, and thus the aerial platform information server 114 may not be present. Thus, it will be further understood in light of the teaching and disclosure herein that various components shown in FIG. 1 need not be implemented as physically distinct components. As another example, the database 110 may be implemented as suitable data storage included in, for example, the insurance provider server 108.

Furthermore, while various devices are shown as being communicatively coupled to the computer network 104, other arrangements may be implemented. For example, the aerial platform information server 114 may be directly connected to the insurance provider server 108 (not shown as such in FIG. 1), and/or may be indirectly connected to the insurance provider server 108 via, for example, components other than the computer network 104 (not shown in FIG. 1).

Still further, it will be appreciated from the teaching and disclosure herein that one or more components of the example system 100 may, in various embodiments, not perform or implement one or more actions described herein with respect to such component(s). As such, in various embodiments, one or more components of the example system 100 may be configured to perform various actions, but may perform less than all of such various actions.

As further described below, the example system 100 utilizes data regarding a storm or other event that causes insured losses, including data before the event, during the event, and/or after the event; indications of locations of the plurality of properties 102; and image data and results of processing thereof that indicate conditions of the plurality of properties 102 after the storm or other event to provide data associated with insured losses via a user interface. The storm or other event, and damage to the plurality of properties 102, may thus be tracked and assessed using, for example, the event data and the image information. In this manner, among other advantages, representatives (e.g., representatives at a main office, agents, etc.) of an insurance provider may assess and formulate an appropriate response to the event even when damaged area(s) is/are inaccessible, and appropriate resources may be deployed, as further discussed herein.

Figure 2:
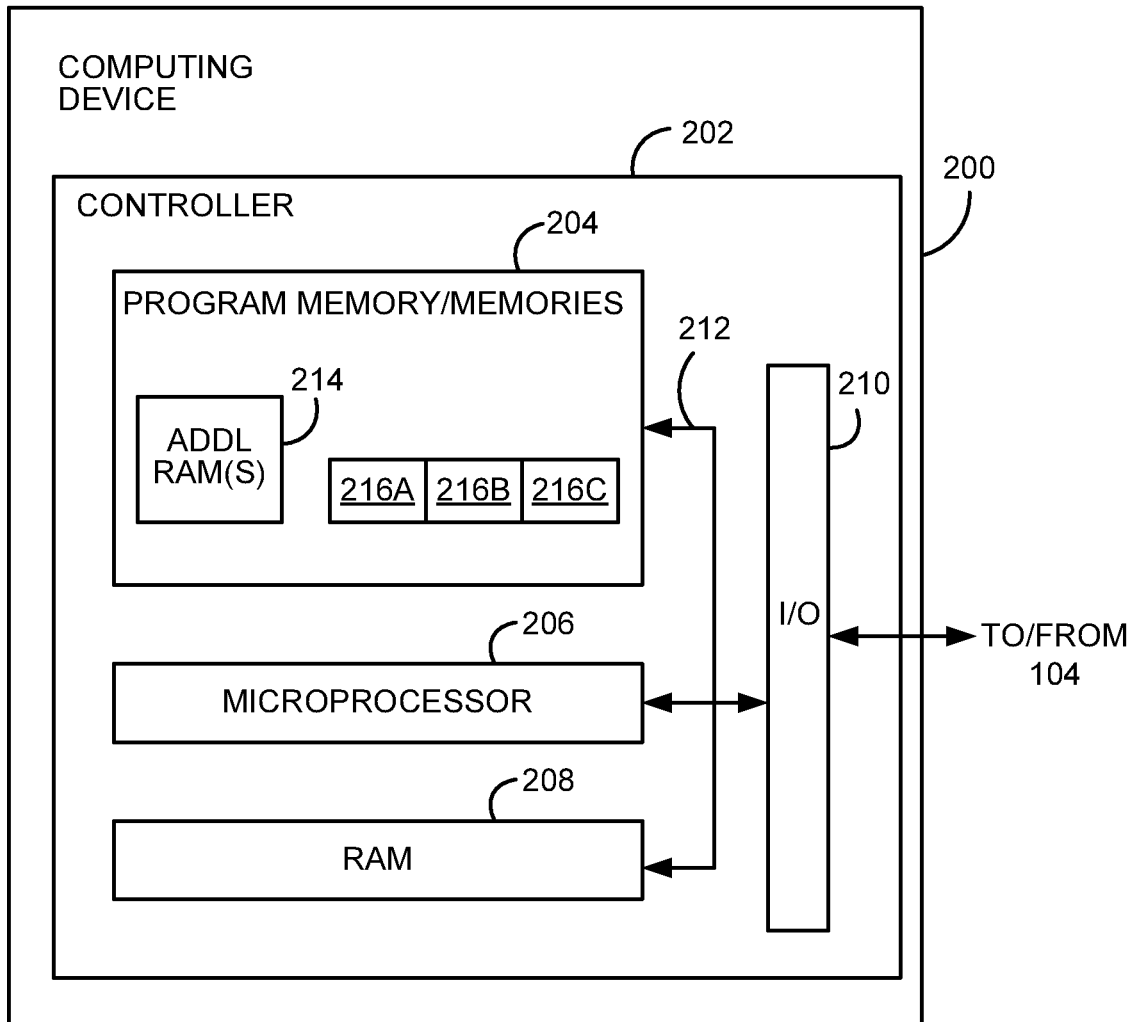
FIG. 2 illustrates an example computing device and components thereof.

Referring now to FIG. 2, an example computing device 200 and components thereof are illustrated. The example computing device 200 and components thereof may be used in implementing, for example, one or more of the insurance provider server 108, the mobile computing device 112, the aerial platform information server 114, etc. In the example shown in FIG. 2, the computing device 200 may include a controller 202. The controller 202 may include a program memory 204, a microcontroller or a microprocessor 206, a random-access memory (RAM) 208, and an input/output (I/O) circuit 210, all of which may be interconnected via an address/data bus 212. The program memory 204 may store computer-executable instructions, which may be executed by the microprocessor 206.

It should be appreciated that although FIG. 2 depicts only one microprocessor 206, the controller 202 may include multiple microprocessors 206. Similarly, the program memory 204 of the controller 202 may include additional RAM(s) 214 and multiple program memories storing, for example, modules, routines, and/or instructions for multiple corresponding applications 216A, 216B, and 216C (or any suitable number of applications), according to the particular configuration of the controller 202 and the computing device 200. Such modules, routines, and/or instructions, etc. may be used in performing various operations for providing data associated with insured losses, such as example operations as described herein.

Additionally, although FIG. 2 depicts the I/O circuit 210 as a single block, the I/O circuit 210 may include a number of different types of I/O circuits (not depicted). The RAM(s) 208, 214 and the program memory/memories storing, for example, instructions for the applications 216A, 216B and 216C, may be implemented in any known form of non-transitory computer readable storage media, including but not limited to semiconductor memories, magnetically readable memories, and/or optically readable memories. It should also be appreciated that the example computing device 200 may include additional, fewer, or alternate components.

Figure 3A:
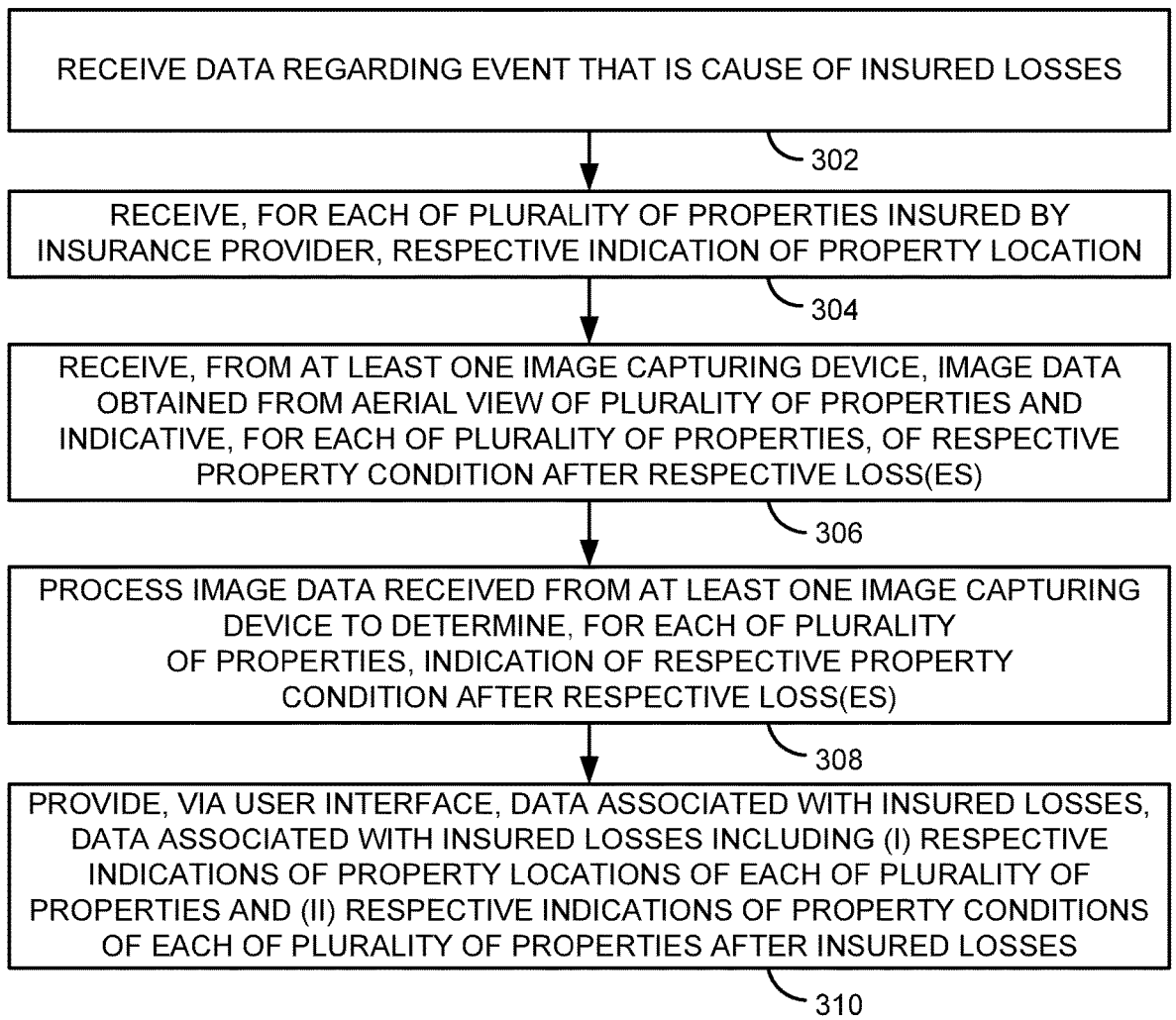
FIG. 3A is a flow chart of an example method, routine, or process for providing data associated with insured losses.

III. Example Methods for Providing Data Associated with Insured Losses, Including Example Associated User Interfaces FIG. 3A is a flow chart of an example method, routine, or process 300 for providing data associated with insured losses, such as insured losses sustained by the plurality of properties 102. One or more processors, which may be one or more processors of the insurance provider server 108 and/or one or more of the plurality of insurance representative computing devices 120, such as a microprocessor(s) implemented as described above with respect to FIG. 2, may receive data regarding an event (e.g., a storm such as an earthquake, hurricane, mud slide, thunderstorm, tsunami, tornado, etc.) that is a cause of the insured losses (block 302). With reference to the discussion above, the data regarding the event may be received from the event data service 106. With further reference to the discussion above, the event data service 106 may be or may include, for example, a computing device such as a server that provides weather data associated with particular locations, such as locations of the plurality of properties 102. The event data service 106 may obtain event data using a suitable API of, for example, the insurance provider or another party. For example, as noted above, the event data service 106 may obtain event data using the IBM® Weather Alerts for Insurance API, or may obtain the event data in a similar or otherwise suitable manner.

As further discussed herein, the data regarding the event (at times referred to herein as "event data") may be data regarding the event before, during, and/or after the event. For example, the data regarding the event may be data for causing a weather radar display on a user interface associated with the insurance provider server 108 (e.g., a user interface of one of the plurality of insurance representative computing devices 120). Such a weather radar display may indicate weather conditions at, for example, the locations of the plurality of properties 102 before, during, and/or after the event. In another example, the data regarding the event may be or may include suitable statistics regarding the event, such as a magnitude of an earthquake that has occurred, for example.

Figure 4A:
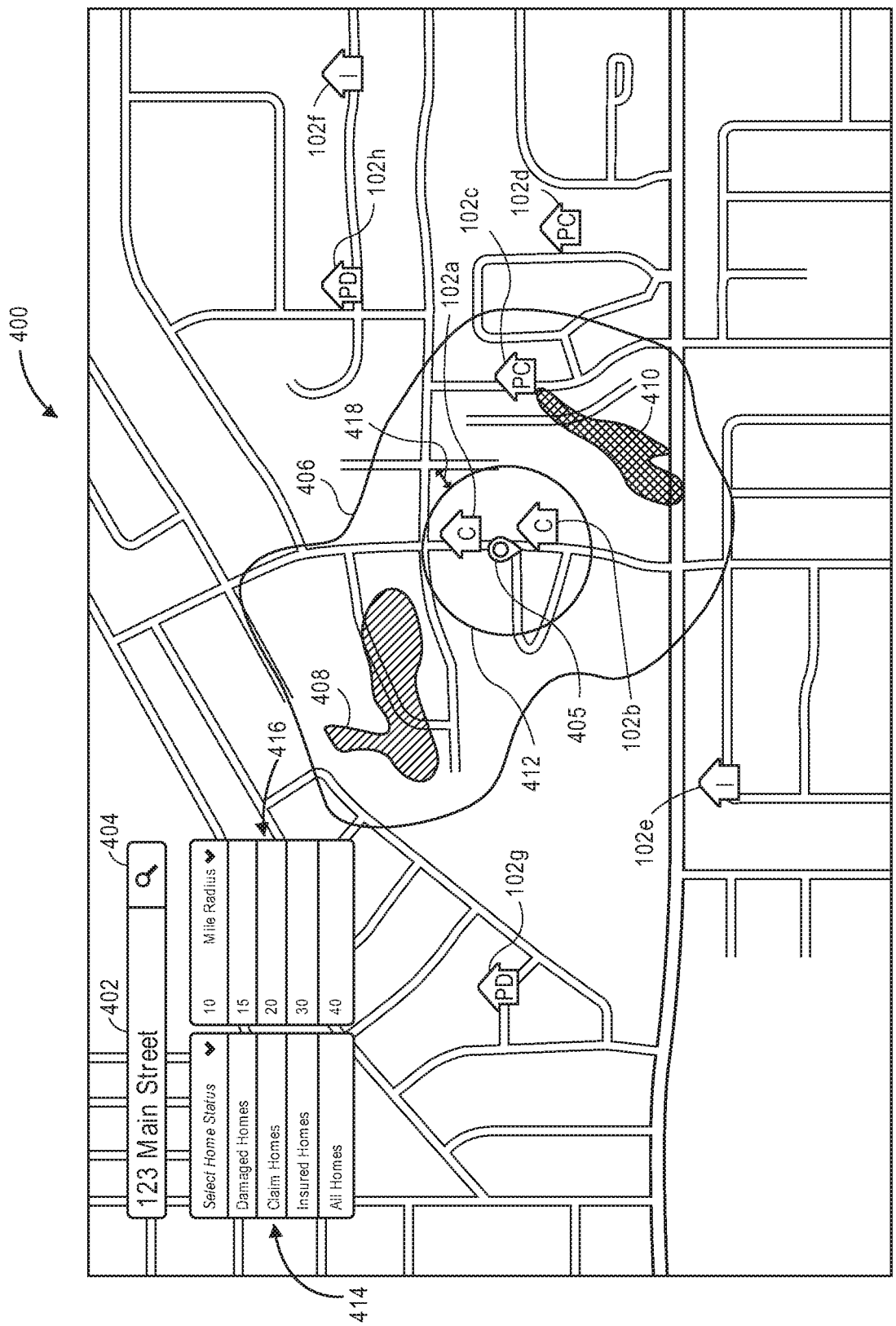
FIG. 4A illustrates an example user interface associated with providing data associated with insured losses.

With continued reference to the actions described with respect to block 302, FIG. 4A illustrates an example user interface 400 associated with providing data associated with insured losses. One or more electronic devices (e.g., one or more of the plurality of insurance representative computing devices 120) may be configured to display the example user interface 400 and/or may be configured to receive selections and/or inputs via the example user interface 400. In some embodiments, a mobile application (e.g., an application such as the application 216A, which may be developed to facilitate the providing of the data associated with the insured losses), may be executed by the insurance representative computing device(s) 120 (such as described above with respect to FIG. 2) and may cause display of the example user interface 400 on a display(s) of the insurance representative computing device(s) 120.

As shown in FIG. 4A, the example user interface 400 includes the plurality of properties 102, which in this example are shown as properties 102a-102h, though it will be appreciated that any suitable number of properties may be included in the plurality of properties 102 and/or included in the example user interface 400. The plurality of properties 102 may include the first, second, and third properties 102a-102c described above with respect to FIG. 1, and may also include fourth, fifth, sixth, seventh, and eight properties 102d, 102e, 102f, 102g, and 102h, respectively. In the example of FIG. 4A, the first and second properties 102a and 102b are each labeled "C," which may designate the first and second properties 102a and 102b as "claim homes," which in turn may indicate homes or properties which have sustained insured loss(es) from the event and with respect to which corresponding claims have been filed with the insurance provider. The third and fourth properties 102c and 102d are each labeled "PC," which may designate the third and fourth properties 102c and 102d as "previous claim homes," which in turn may indicate homes and properties which have previously sustained insured loss(es) from the event or a previous event and with respect to which corresponding claims have previously been filed with the insurance provider. In various embodiments, a claim may be considered to be a previous claim, and thus a corresponding one of the plurality of properties 102 may be labeled "PC" instead of "C" in the example user interface 400, if the claim is for a previous event, if the claim was filed a particular amount of time before the time to which the data in the example user interface 400 corresponds, if the claim is at a particular stage of processing, and/or according to any other suitable criteria.

As further shown in FIG. 4A, the fifth and sixth properties 102e and 102f are each labeled "I," which may designate the fifth and sixth properties 102e and 102f as "insured homes," which in turn may indicate homes or properties that are insured by the insurance provider but for which no damage has been detected or reported, and for which no claim for an insured loss has been filed with the insurance provider. FIG. 4A also shows that the seventh and eighth properties 102g and 102h are each labeled "PD," which may designate the seventh and eighth properties 102g and 102h as "previously damaged homes," which in turn may indicate homes or properties which have previously (e.g., as a result of a previous event, before a particular time, etc.) sustained insured losses. Furthermore, while not shown in the example of FIG. 4A, properties may be labeled "D" in some examples, which may designate such properties as "damaged homes," which in turn may indicate homes or properties which have sustained insured losses as a result of the current event, after a particular previous time, etc.

With continued reference to the actions described with respect to block 302 and to FIG. 4A, the example user interface 400 includes a property address field 402, in which a user may enter an address (e.g., 123 Main Street, as shown) of a property (e.g., one of the plurality of properties 102 or another property) upon which the user wishes to center the map shown in the example user interface 400. The example user interface 400 may further include a property selection option 404 which, when selected (e.g., by way of touch input, a mouse click, etc.), may cause the map shown in the example user interface 400 to display a marker 405 at the property indicated in the property address field 402 and to center on such property and the corresponding marker 405, as shown in FIG. 4A.

The example user interface 400 also illustrates a first weather area 406, which may correspond to, for example, an area of light rain; a second weather area 408, which may correspond to, for example, an area of heavier rain and which is shown with hatching; and a third weather area 410, which may correspond to, for example, an area of thunderstorms or other severe weather and which is shown with cross hatching. In the example of FIG. 4A, the first weather area 406 may include the second weather area 408 and the third weather area 410 as shown. Additionally, the example user interface 400 may include a graphical area 412 centered on the marker 405, with a size (e.g., radius) of the graphical area 412 being adjustable as described below. The graphical area 412 may, for example, define an area to be displayed if a user of the example user interface 400 zooms in. For example, if a user zooms in, content (e.g., one or more properties) within the graphical area 412 may appear closer (zoomed-in), while a zoom of areas outside the graphical area 412 may not appear different after a zoom operation. Additionally or alternatively, the contents of the graphical area 412 may be selected (e.g., by a suitable option not shown in FIG. 4A) for magnified display in another user interface (not shown in FIG. 4A), and/or the graphical area 412 may define an area that may be utilized for any suitable purpose(s).

With still further reference to the actions described with respect to block 302 and to FIG. 4A, the example user interface 400 also illustrates a home status pull-down menu 414, a mile radius pull-down menu 416, and a radius adjustment icon 418. FIG. 4A illustrates an example in which, when selected, the home status pull-down menu 414 displays options for a user to select "Damaged Homes," "Claim Homes," "Insured Homes," or "All Homes." It should be appreciated in light of the teaching and disclosure herein that selection of the "Damaged Homes" option may cause properties other than the "damaged homes" indicated by "D" as described above not to be displayed (e.g., the example user interface 400 may display only "damaged homes"). In some embodiments, selection of the "Damaged Homes" option may also cause display of "previously damaged" homes indicated by "PD" as described above. It should further be appreciated in light of the teaching and disclosure herein that selection of the "Claim Homes" option may cause only "claim homes" indicated by "C" or, in some cases, only "claim homes" indicated by "C" and "previous claim homes" indicated by "PC" to be displayed in the example user interface 400. Correspondingly, selection of the "Insured Homes" option may cause only "insured homes" indicated by "I" as described above to be displayed in the example user interface 400. Selection of "All Homes" may cause all homes, regardless of indicator or status, that are insured by the insurance provider to be displayed in the example user interface 400. In some examples, selection of "All Homes" or another suitable option (not shown in FIG. 4A) may cause display of all homes, regardless of whether such homes are or are not insured by the insurance provider, to be displayed, with data regarding homes not insured by the insurance provider being obtained from any suitable publicly available source, API, etc. In some embodiments, when all homes are displayed, regardless of whether such homes are or are not insured by the insurance provider, homes that are not insured by the insurance provider may be suitably indicated as such (e.g., with a suitable alphanumeric designation such as "N").

The mile radius pull-down menu 416 may be used to select a radius for the graphical area 412, with example radius options being shown in FIG. 4A. Additionally or alternatively, a user of the example user interface 400 may use the radius adjustment icon 418 by, for example, clicking on, touching via touch input, or otherwise selecting the radius adjustment icon 418 and then using a mouse pointer, touch input, etc. to stretch or shrink the graphical area 412, for example.

As will be appreciated in light of the description of FIG. 4A, the example user interface 400 may, in various embodiments, allow data regarding an event that is a cause of insured losses to be received and, for example, displayed or otherwise provided via a user interface before, during, and/or after the event. Locations of homes, such as the plurality of properties 102, may also be displayed or otherwise provided via the user interface based on receipt of such data from, for example, the insurance provider (e.g., from storage of the insurance provider server 108 and/or from the database 110). Still further, with reference to the discussion below, locations of mobile response units deployed by an insurance provider may also be displayed. By providing such data even when, for example, the plurality of properties 102 that have sustained the insured losses may not be accessible by ground transportation, and/or before accurate damage reports are available, the techniques described herein allow actual and/or potential damage to properties to be assessed early so that resources may be effectively deployed to the affected areas and to insured parties. For example, deployment of such resources may include providing of funding to insured parties for living expenses such as hotel stays, etc., with such funding in some examples being by way of payments directly to the insured parties such as by electronic funds transfer, as further described herein. As also further described herein, such actual and/or potential damage may be determined at least in part from image data received from at least one image capturing device, which may be part of a manned aircraft, a satellite, and/or a UAS. In some embodiments, such actual and/or potential damage may also be determined based on the data regarding the event (e.g., data regarding severity of weather, such as severity/severities determined based on the first, second, and third weather regions 406, 408, and 410), based on the locations of the plurality of properties 102, and/or based on any other suitable factors.

With continued reference to the example method, routine, or process 300, the one or more processors may receive, for each of the plurality of properties 102, a respective indication of a location of the property (block 304). Each of the plurality of properties 102 (e.g., including the properties 102*a*-*h* in FIG. 4A) may be insured by the insurance provider, and the plurality of properties 102 may sustain the insured losses. More particularly, each of the plurality of properties 102 may be a property with respect to which an insured party has insurance coverage from the insurance provider, and each of the plurality of properties 102 may sustain one or more of the insured losses (e.g., roof damage, flooding, etc.). In some embodiments, the one or more processors may receive the respective indications of the locations of each of the plurality of properties 102 from data storage of the insurance provider, which may be data storage in, for example, the insurance provider server 108 and/or the database 110. For example, when an insured party obtains or applies for insurance coverage with respect to one of the plurality of properties, the location of the property may be stored by the insurance provider and received by the one or more processors (which may be one or more processors of the insurance provider server 108) as described with respect to block 304.

With reference to the discussion of FIG. 4A and, for example, the home status pull-down menu 414, the example user interface 400 may include desired ones of the plurality of properties 102 at their respective locations (e.g., by way of including icons corresponding to the desired ones of the plurality of properties 102, such as icons shown in FIG. 4A) based on the home status selected by way of the home status pull-down menu 414. For example, selection of the "Damaged Homes" option may cause display of "damaged" homes (e.g., icons corresponding to "damaged" homes) indicated by "D" as described above, and/or may cause display of "previously damaged" homes (e.g., corresponding icons) indicated by "PD" as described above.

The one or more processors may receive, from at least one image capturing device (e.g., the at least one image capturing device 118), image data obtained from an aerial view of the plurality of properties 102 (block 306). For example, the image data may be obtained by the at least one image capturing device 118 oriented on and/or in the aerial platform 116 (e.g., a manned aircraft, satellite, and/or UAS). The image data may be indicative, for each of the plurality of properties 102, of a respective condition of the property after the property sustains a respective one or more of the insured losses. More particularly, the respective conditions of each of the plurality of properties 102 may be indicated by the image data received from the at least one image capturing device 118. With reference to the discussion above, the at least one image capturing device 118 may include at least one image sensor. For example, the at least one image capturing device 118 may, with further reference to the discussion above, include at least one camera or other suitable image capturing device configured and/or oriented on and/or in the aerial platform 116 so that the at least one image capturing device 118 receives image data obtained from the aerial view of the plurality of properties 102.

Accordingly, even when the plurality of properties 102 is not accessible via ground transport, for example, a user of one or more of the plurality of insurance representative computing devices 120 may cause deployment of the aerial platform 116, capturing of the image data, and receipt of indications of the respective conditions of each of the plurality of properties 102 at, for example, one or more of the plurality of insurance representative computing devices 120 and/or the insurance provider server 108. The received indications of the respective conditions of each of the plurality of properties 102 may be used to designate icons corresponding to various ones (or all) of the plurality of properties 102, such as described and shown with respect to FIG. 4A. Additionally or alternatively, the received indications of the respective conditions of each of the plurality of properties 102 may be used to show an actual image(s) of the damage to one or more of the plurality of properties 102 via a suitable user interface, a damage level(s) of one or more of the plurality of properties 102, etc., as further discussed below.

The one or more processors may process the image data received from the at least one image capturing device 118 to determine, for each of the plurality of properties 102, an indication of the respective condition of the property after the property sustains the respective one or more of the insured losses (block 308). With reference to the discussion below, the processing of the image data may include, for example, utilization of machine learning techniques, image recognition techniques, map data, and/or any other suitable techniques and/or data to determine the indications of the respective conditions of each of the plurality of properties 102.

The one or more processors may provide, via a user interface such as the example user interface 400 and/or another example user interface(s) described herein, data associated with the insured losses (block 310). The data associated with the insured losses may include (i) the respective indications of the locations of each of the plurality of properties 102, and (ii) the indications of the respective conditions of each of the plurality of properties 102 after the plurality of properties 102 sustains the insured losses. In some embodiments, the data associated with the insured losses may be provided via the example user interface 400 by displaying icons of properties at the locations of those properties as discussed above, and by displaying designations of whether particular properties are "damaged," "previously damaged," etc., as also described above. Additionally or alternatively, the indications of the respective conditions of each of the plurality of properties 102 may be provided via a user interface such as one of the example user interfaces described below, and may include a respective image(s) of a property/ies of the plurality of properties 102 that has sustained damage, a respective damage level(s) of such a property/ies, etc.

Figure 4B:
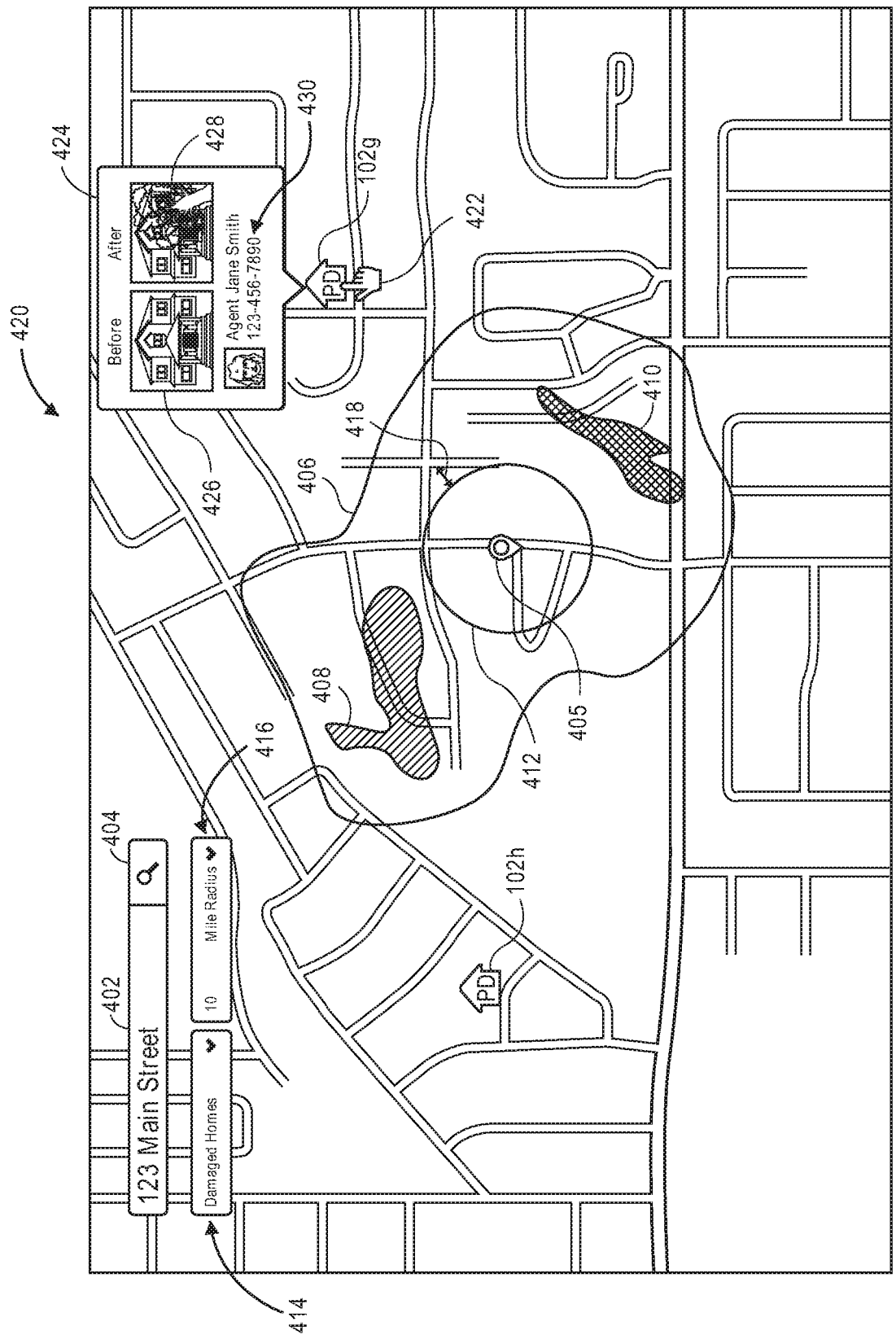
FIG. 4B illustrates another example user interface associated with providing data associated with insured losses.

With continued reference to the actions described with respect to block 310, and turning also to FIG. 4B, FIG. 4B illustrates another example user interface 420 associated with providing data associated with insured losses. One or more electronic devices (e.g., one or more of the plurality of insurance representative computing devices 120) may be configured to display the example user interface 420 and/or may be configured to receive selections and/or inputs via the example user interface 420. In some embodiments, a mobile application (e.g., an application such as the application 216A, which may be developed to facilitate the providing of the data associated with the insured losses), may be executed by the insurance representative computing device(s) 120 (and/or another suitable computing device(s)) (such as described above with respect to FIG. 2) and may cause display of the example user interface 400 on a display(s) of the insurance representative computing device(s) 120.

As shown in FIG. 4B, the example user interface 420 includes the properties 102g and 102h; the property address field 402; the property selection option 404; the marker 405 located at the property indicated in the property address field 402; the first weather area 406; the second weather area 408; the third weather area 410; the graphical area 412 centered on the marker 405; the home status pull-down menu 414 (shown in collapsed format in FIG. 4B with "Damaged Homes" selected); the mile radius pull-down menu 416 (shown in collapsed format in FIG. 4B with ten (10) miles selected); and the radius adjustment icon 418 as included in FIG. 4A. As further shown in FIG. 4B, the example user interface 420 also includes a pointer icon 422, which is shown as a hand, which may be used to hover over a particular one of the plurality of properties 102 and cause display in the example user interface 420 of an enlarged view of the particular property, for example.

More particularly, in the example of FIG. 4B, the pointer icon 422 may be placed (e.g., by way of user input) over the icon corresponding to the seventh property 102g, which as discussed above may be a "previously damaged home." When the pointer icon 422 is placed over the icon corresponding to the seventh property 102g, an enlarged view window 424 may be caused (e.g., by the one or more processors) to be displayed in the example user interface 420. The enlarged view window 424 may include a "before" image 426 and an "after" image 428, which may be images of the corresponding property (in this case the seventh property 102g) before and after the storm or other event occurs at the location of the corresponding property.

The "before" image 426 may, in some embodiments, be an image of the property stored by the insurance provider before the event, such as an image from a publicly available source or an image otherwise taken by or obtained by the insurance provider before the event, such as at a time of issuance of or renewal of an insurance policy with respect to the property. The "after" image 428 may, in some embodiments, be obtained from the image data received as described with respect to block 306 and processed as described with respect to block 308. For example, the "after" image 428 may be a street-level or perspective view instead of an overhead image by way of the one or more processors using, in some cases, a three-dimensional surface model of the property (e.g., based on the "before" image 426) in conjunction with image data corresponding to an aerial/overhead view to determine and construct a street-level or perspective image of the property. The enlarged view window 424 may further include agent information 430 indicative of an insurance agent of the insurance provider who, for example, manages an insurance policy (or policies) with respect to the corresponding property (in this example, the seventh property 102g).

Figure 4C:
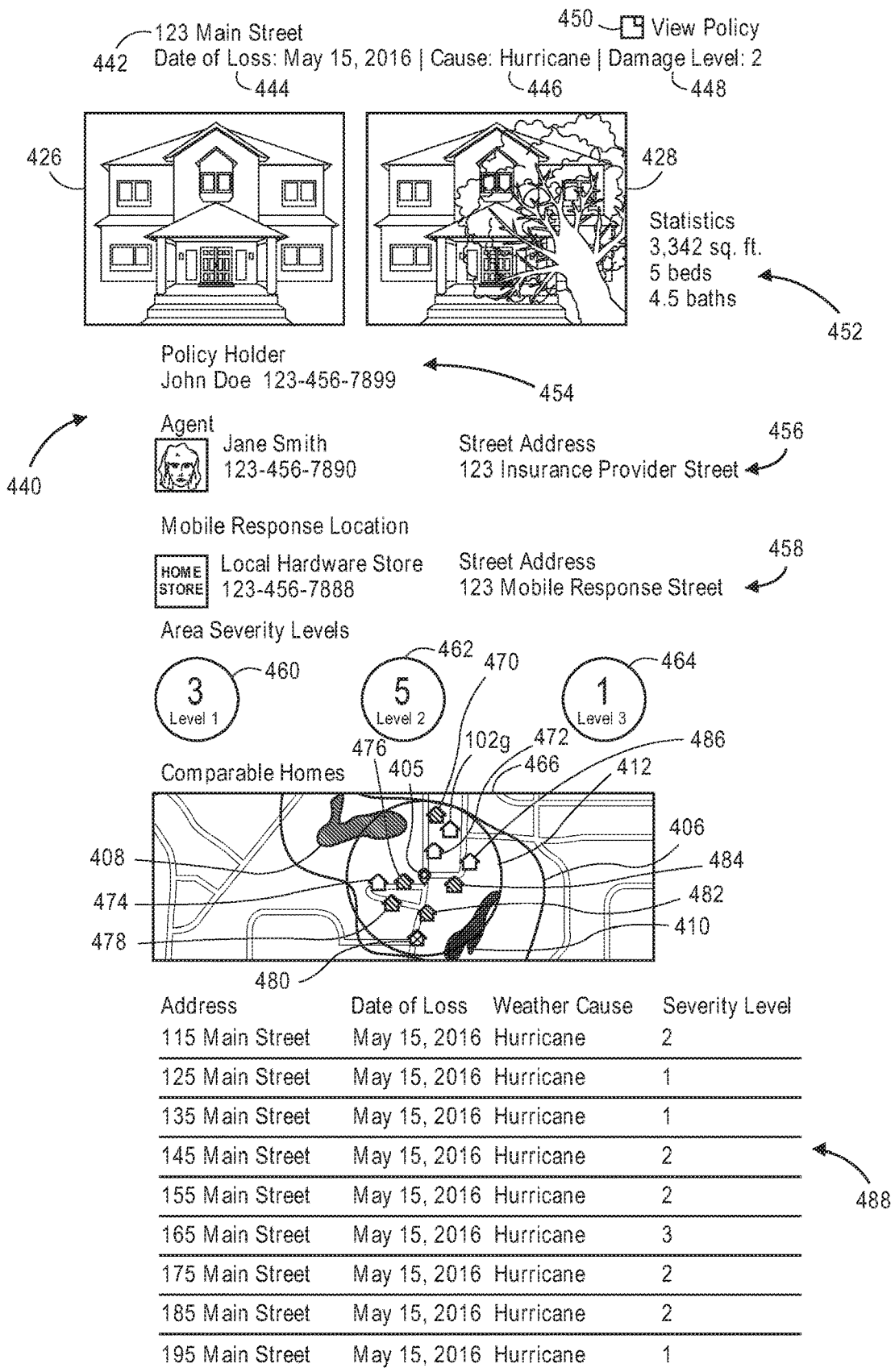
FIG. 4C illustrates another example user interface associated with providing data associated with insured losses.

With continued reference to the actions described with respect to block 310, and turning also to FIG. 4C, FIG. 4C illustrates another example user interface 440 associated with providing data associated with insured losses. The example user interface 440 may be a more detailed enlarged view user interface (e.g., corresponding to the seventh property 102g, as with the example of FIG. 4B) that may be displayed instead of or in addition to the example user interface 420. As shown in FIG. 4C, the example user interface 440 may include property address data 442 (e.g., indicating in the illustrated example that the seventh property 102g is located at 123 Main Street); date of loss data 444 (e.g., indicating that the storm or other event causing an insured loss(es) with respect to the seventh property 102g occurred on May 15, 2016); loss cause data 446 (e.g., indicating that the insured loss(es) were caused by a hurricane in the illustrated example); damage level data 448 (e.g., indicating that the damage level to the seventh property 102g is level two (2), as further discussed below); and a view policy option 450 which, when selected by suitable user input, may cause display of an insurance policy document(s) with respect to the seventh property 102g.

As further shown in FIG. 4C, the example user interface 440 may include the "before" image 426 and the "after" image 428; property data 452 such as property statistics (e.g., a square footage, number of bedrooms, and number of bathrooms of the seventh property 102g); policyholder data 454 such as identifying information and contact information regarding one or more insured parties associated with (e.g., owning) the seventh property 102g; detailed agent data 456 such as identifying information and contact information regarding an insurance agent of the insurance provider who, for example, manages an insurance policy or policies with respect to the seventh property 102g; and mobile response unit location data 458, such as information identifying a local hardware store having a parking lot to which a mobile response unit of the insurance provider is or will be deployed, and contact information for the local hardware store (or other suitable location, such as a church or school having a parking lot to which the mobile response unit is deployed).

Accordingly, and with continued reference to the actions described with respect to block 310 and FIGS. 4B and 4C, it will be further appreciated from the teaching and disclosure herein that the data associated with the insured losses may include at least one of an enlarged view of one or more of the plurality of properties 102 before the event and/or after the event; property data regarding the one or more of the plurality of properties 102 (e.g., the property data 452); data regarding one or more insured parties associated with the one or more of the plurality of properties 102 (e.g., the policyholder data 454); data regarding one or more agents of the insurance provider associated with the one or more of the plurality of properties 102 (e.g., the detailed agent data 456); and/or data regarding one or more insurance policies issued by the insurance provider with respect to the one or more of the plurality of properties 102 (e.g., as accessible via the view policy option 450).

The example user interface 440 may also include a first number 460 of the plurality of properties 102 having a first level of damage from the event (e.g., a high level of damage); a second number 462 of the plurality of properties 102 having a second level of damage from the event (e.g., a medium level of damage); and a third number 464 of the plurality of properties 102 having a third level of damage from the event (e.g., a low level of damage or, in some cases, a low level of damage or no damage). It should be appreciated that while the example user interface 440 may be a more detailed enlarged view user interface based on placing the pointer icon 422 over the seventh property 102g when "Damaged Homes" are selected in the home status pull-down menu 414, as discussed above, the number of properties shown as having each level of damage may, for example, account for all of the plurality of properties 102 that have the corresponding level of damage. Thus, in the example of FIG. 4C, the first number 460 of the plurality of properties may be three (3), indicating that three of the plurality of properties 102 have the first level of damage. The second number 462 of the plurality of properties may be five (5), indicating that five of the plurality of properties 102 have the second level of damage, and the third number 464 of the plurality of properties may be one (1), indicating that one of the plurality of properties 102 has the third level of damage, for example.

Accordingly, it will be appreciated from the teaching and disclosure herein that the data associated with the insured losses may include map data indicative of a map view of the plurality of properties 102 sustaining the insured losses (such as the map view shown in the user interfaces of FIGS. 4A and 4B). It will also be appreciated from the teaching and disclosure herein that the data associated with the insured losses may also or alternatively indicate (i) a first number (e.g., the first number 460) of the plurality of properties 102, where for each property of the first number of the plurality of properties 102, the respective condition of the property is associated with the first level of damage, (ii) a second number (e.g., the second number 462) of the plurality of properties 102, where for each property of the second number of the plurality of properties 102, the respective condition of the property is associated with the second level of damage, and, in some cases (iii) a third number and, if desired, additional numbers, of the plurality of properties 102, where for each property of such a third and/or additional numbers of the plurality of properties 102, the respective condition of the property is associated with the third level of damage or an additional level of damage.

With continued reference to the actions described with respect to block 310 and to FIG. 4C, the example user interface 440 may also include a reduced map view 466, which may be reduced in size compared to the map views shown in the example user interfaces 400 and 420 but which may contain at least some of the same information, for example. For example, as shown in FIG. 4C, the reduced map view 466 includes the marker 405; the first weather area 406; the second weather area 408; the third weather area 410; and the graphical area 412. In some embodiments (not shown in FIG. 4C), additional features from the example user interface(s) 400 and/or 420 may be included, such as the radius adjustment icon 418, which may be used to change the radius of the graphical area 412 in the same or a similar manner as described with respect to FIG. 4A.

The example user interface 440 may still further include, such as in the reduced map view 466 as shown, icons corresponding to various ones of the plurality of properties 102, and in particular the property identified by the property address data 442 and ones of the plurality of properties 102 that are insured by the insurance provider and geographically close to the property identified by the property address data 442. Such icons corresponding to the identified property and geographically proximate properties may, but need not, include any or all of the first-eighth properties 102a-102g. As such, in the example of FIG. 4C, the icons corresponding to the identified property and geographically proximate properties include icons for the property identified in the property address data 422 (which as discussed above and shown in FIG. 4C, may be the seventh property 102g); a first proximate property 470; a second proximate property 472; a third proximate property 474; a fourth proximate property 476; a fifth proximate property 478; a sixth proximate property 480; a seventh proximate property 482; an eighth proximate property 484; and a ninth proximate property 486.

As further shown in FIG. 4C, each proximate property is identified in a proximate property table 488 indicating, for each of the proximate properties 470-486, an address, a date of the insured loss, a weather (or other event) cause or type, and a severity level (e.g., damage level, such as one of the damage levels discussed above). The ones of the identified property and the proximate properties 470-486 having the first damage level (e.g., severity level one (1)) are shown with cross hatching; the ones of the identified property and the proximate properties 470-486 having the second damage level (e.g., severity level two (2)) are shown with one-way hatching; and the ones of the identified property and the proximate properties 470-486 having the third damage level (e.g., severity level three (3)) are shown with no hatching.

Figure 4D:
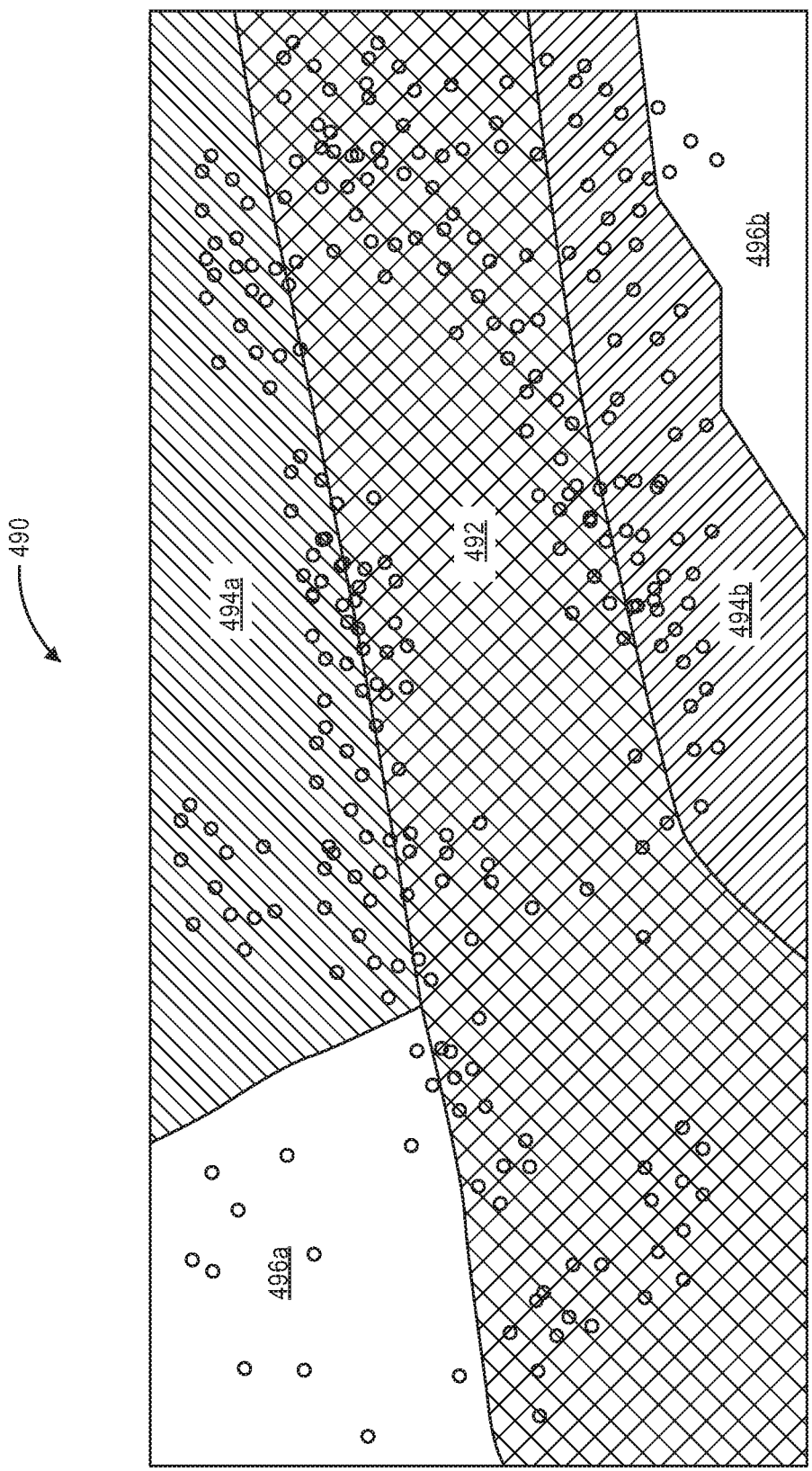
FIG. 4D illustrates yet another example user interface associated with providing data associated with insured losses.

With still further reference to the actions described with respect to block 310, and referring also to FIG. 4D, FIG. 4D illustrates yet another example user interface 490 associated with providing data associated with insured losses. The example user interface 490 may include an additional or alternative map view (e.g., as compared to the reduced map view 466) of the plurality of properties 102 and associated levels of damage (also referred to herein as "damage levels"). For example, FIG. 4D shows the example user interface 490 as including a first damage level region 492, two second damage level regions 494a and 494b, and two third damage level regions 496a and 496b. FIG. 4D also shows a number of circles within each of the first, second, and third damage level regions 492, 494a, 494b, 496a, and 496b, where each circle may correspond to a property, such as one of the plurality of properties 102 (not shown as such in FIG. 4D).

Thus, it will be appreciated that the example user interface 490 of FIG. 4D may indicate in particular that properties within the first, second, and third damage level regions 492, 494a, 494b, 496a, and 496b have sustained the corresponding levels of damage, and may indicate in general that geographical areas within the first, second, and third damage level regions 492, 494a, 494b, 496a, and 496b have sustained or are associated with the corresponding levels of damage. As with the indicated damage levels of FIG. 4C, the indicated damage levels of FIG. 4D may be determined (e.g., by the one or more processors) based on the processed image data (e.g., based on the indications of the respective conditions of each of the plurality of properties 102 after the insured losses). For example, as further described below, the image data may be processed to determine an indication of a similarity of the image data to previous image data indicative of damage to property and a condition of property, and the indicated damage level(s) may depend on the indicated similarity of the image data to the previous image data and on the level(s) of damage corresponding to such previous image data.

As further shown in FIG. 4D, properties and regions with different indicated damage levels are shown with different patterns of hatching (or no hatching). More particularly, in the example of FIG. 4D, the first damage level region 492 and properties therein are shown with cross hatching; the second damage level regions 494a and 494b and properties therein are shown with one-way hatching; and the third damage level regions 496a and 496b and properties therein are shown with no hatching.

As will be apparent from the above description, and as should be appreciated with respect to all examples presented in this disclosure, various ones of the functions or operations shown in FIG. 3A may be optional. Furthermore, the functions or operations shown in FIG. 3A (and each flow chart herein) may be performed in any suitable order, any desired number of times, and/or with any suitable variation to the particular order and/or combination shown so as to achieve a desired result, such as a desired manner of providing data associated with insured losses.

Figure 3B:
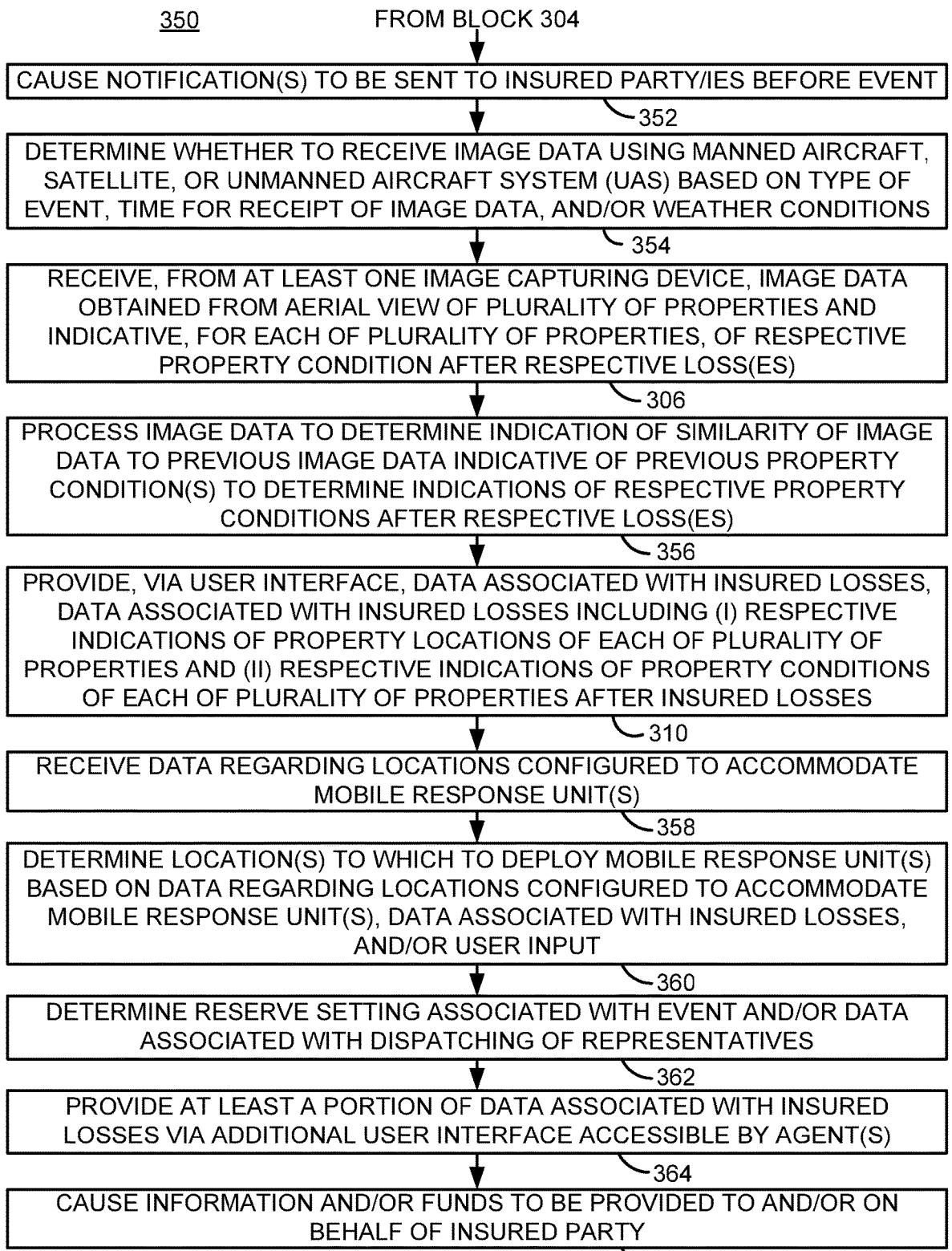
FIG. 3B is a flow chart of another example method, routine, or process for providing data associated with insured losses.

FIG. 3B is a flow chart of another example method, routine, or process 350 for providing data associated with insured losses. As will be appreciated in light of the following discussion, the example method, routine, or process 350 may correspond to a more detailed implementation(s) of aspects of the example method, routine, or process 300, and may include additional actions, such as additional actions relating to providing and/or using the data associated with insured losses.

One or more processors, which may, for example, be one or more processors of the insurance provider server 108 and/or one or more of the plurality of insurance representative computing devices 120, such as a microprocessor(s) implemented as described above with respect to FIG. 2, may perform the actions described with respect to blocks 302 and 304 of FIG. 3A. The one or more processors may cause one or more notifications associated with the event (e.g., storm) to be sent (e.g., pushed to mobile computing devices, such as the mobile computing device 112) to one or more insured parties before the event based on the data regarding the event and the respective indications of the locations of each of the plurality of properties 102 insured by the insurance provider (block 352). The one or more insured parties may be associated with (e.g., may own or rent) one or more of the plurality of properties 102.

More particularly, in some embodiments, a region of interest may be defined on a map, such as by way of selecting the size of the graphical area 412 as discussed above, and when the one or more notifications are sent to one or more insured parties, the notification(s) may be sent to one or more insured parties within the region of interest and not to other insured parties. Additionally or alternatively, in some embodiments, an alert(s) may be received by the one or more processors in response to activation of an option (not shown) to receive such alert(s), with such activation being, for example, by way of user input. The alert(s) may be received from, for example, an API used to provide the data regarding the event, which API may in some embodiments also cause display of, for example, statistics for potential impact or damage from the event for areas and/or particular properties on a map. In some embodiments, receipt of the alert(s) may cause activation of the one or more notifications, such as activation of functionality of the one or more processors and/or mobile computing devices to allow pushing and receiving of the one or more notifications. The one or more notifications may then be sent to the one or more insured parties as described above. In this manner, the one or more insured parties may be notified in advance of potentially damaging and/or dangerous weather conditions based on, for example, data regarding such weather conditions (which may include an expected path of a storm) and location data regarding a property or properties of the one or more insured parties.

The one or more processors may determine whether to receive the image data (as described with respect to block 306) using one of a manned aircraft, a satellite, or a UAS (block 354). The determination may be based on, for example, a type of the event, a time specified for receipt of the image data, actual weather conditions at one or more of the plurality of properties 102 (e.g., one or more of the plurality of properties 102 for which images from an aerial view are specified by a user as needing to be received), and/or expected weather conditions during a period of time (e.g., a time at which the image data is to be obtained/received) at one or more of the plurality of properties 102. For example, if cloudy conditions are expected at one or more of the plurality of properties 102 for which images are needed, and/or at nearby ones of the plurality of properties 102, the one or more processors may determine not to use a satellite(s) to receive the image data. The one of the manned aircraft, the satellite, or the UAS may include the at least one image capturing device 118, as described above.

Figure 5A:
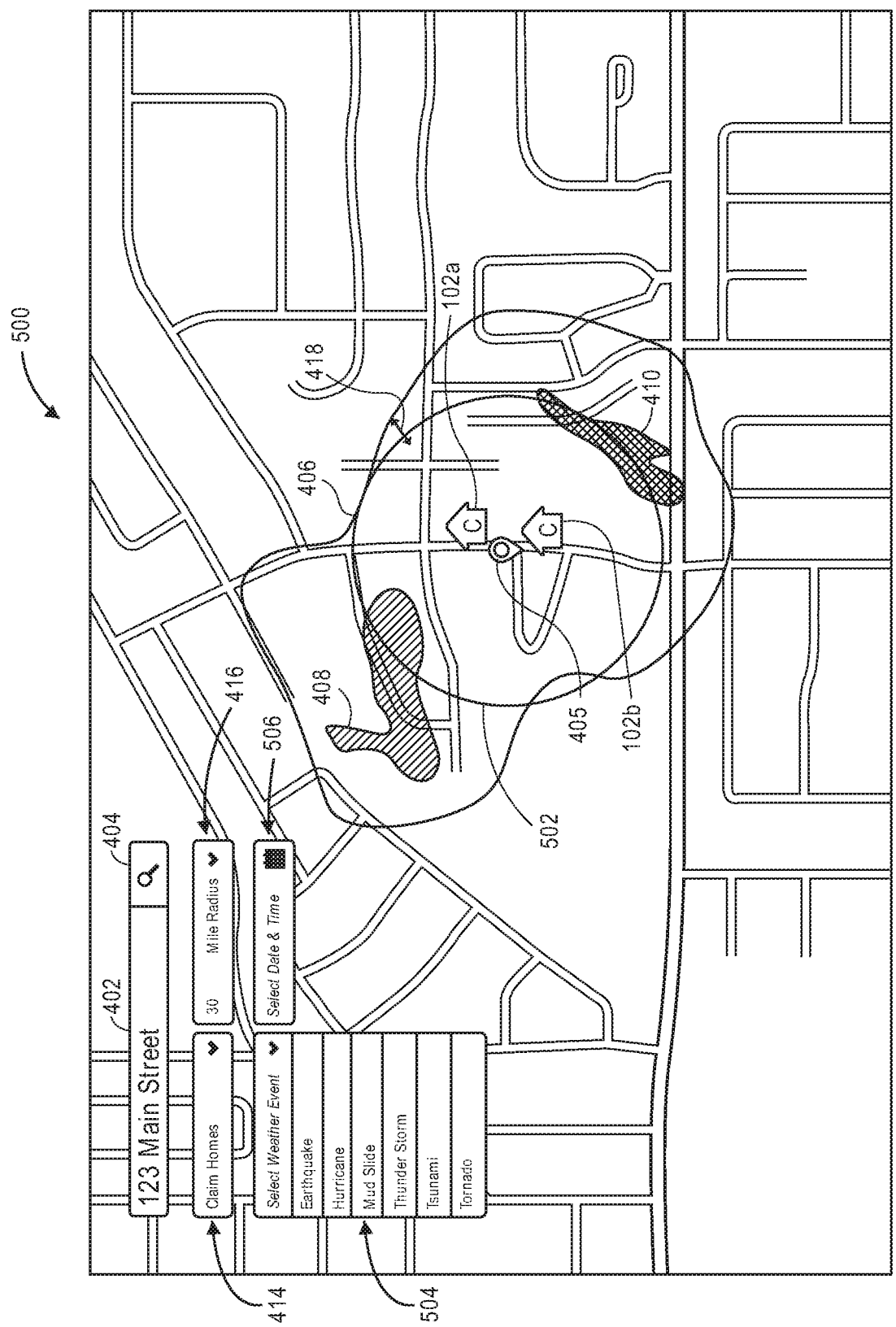
FIG. 5A illustrates another example user interface associated with providing data associated with insured losses.

In some embodiments, a user may select or define a region of interest on a map, where the region of interest may be a region for which images are to be received. In this regard, FIG. 5A illustrates another example user interface 500 associated with providing data associated with insured losses. One or more electronic devices (e.g., one or more of the plurality of insurance representative computing devices 120, the insurance provider server 108, etc.) may be configured to display the example user interface 500 and/or may be configured to receive selections and/or inputs via the example user interface 500. In some embodiments, a mobile application (e.g., an application such as the application 216A, which may be developed to facilitate the providing of the data associated with the insured losses), may be executed by the insurance representative computing device(s) 120 (and/or another suitable computing device(s)) (such as described above with respect to FIG. 2) and may cause display of the example user interface 500 on a display(s) of the insurance representative computing device(s) 120.

As shown in FIG. 5A, the example user interface 500 includes the properties 102a-102h; the property address field 402; the property selection option 404; the marker 405 located at the property indicated in the property address field 402; the first weather area 406; the second weather area 408; the third weather area 410; the home status pull-down menu 414 (shown in collapsed format in FIG. 5A with "Claim Homes" selected); and the mile radius pull-down menu 416 (shown in collapsed format in FIG. 5A with thirty (30) miles selected) as included in FIG. 4A. As further shown in FIG. 5A, the example user interface 500 also includes a region of interest 502, which is centered on the marker 405 in a similar manner as the graphical area 412 of, for example, FIGS. 4A and 4B. The region of interest 502 may be defined in any suitable manner, such as by suitable input into the property address field 402 followed by suitable selection via the property selection option 404 and the mile radius pull-down menu 416, and/or by any other suitable techniques. The one or more processors may determine whether to receive the image data using a manned aircraft, a satellite, or a UAS further based on the region of interest 502 and/or a size (e.g., square mileage, as determined from the radius of the region of interest 502, for example) of the region of interest 502.

As further shown in FIG. 5A, the example user interface 500 includes an event type pull-down menu 504, which may allow a user to select from event type options such as "Earthquake," "Hurricane," "Mud Slide," "Thunder Storm," "Tsunami," "Tornado," and/or any other suitable option(s) not shown in FIG. 5A. The example user interface 500 also includes a date and time pull-down menu 506, which may allow a user to specify a date and time at which the image data is to be received. The actual and/or expected weather conditions as mentioned above, when used in determining whether to receive the image data using a manned aircraft, a satellite, or a UAS, may be determined from, for example, data from the event data service 106 and/or any other suitable device(s) or source(s), such as those described above. The one or more processors may then determine a recommended mode of receiving the image data. For example, as noted above, when cloud cover over the region of interest 502 is dense, use of a satellite may not be recommended. As another example, if a temporary flight restriction over or near the region of interest 502 is in effect, use of a UAS may not be recommended. Other appropriate considerations may be given to the factors identified herein, such as type of event, time of day, time of year, size of the region of interest 502, and/or weather conditions.

Figure 5B:
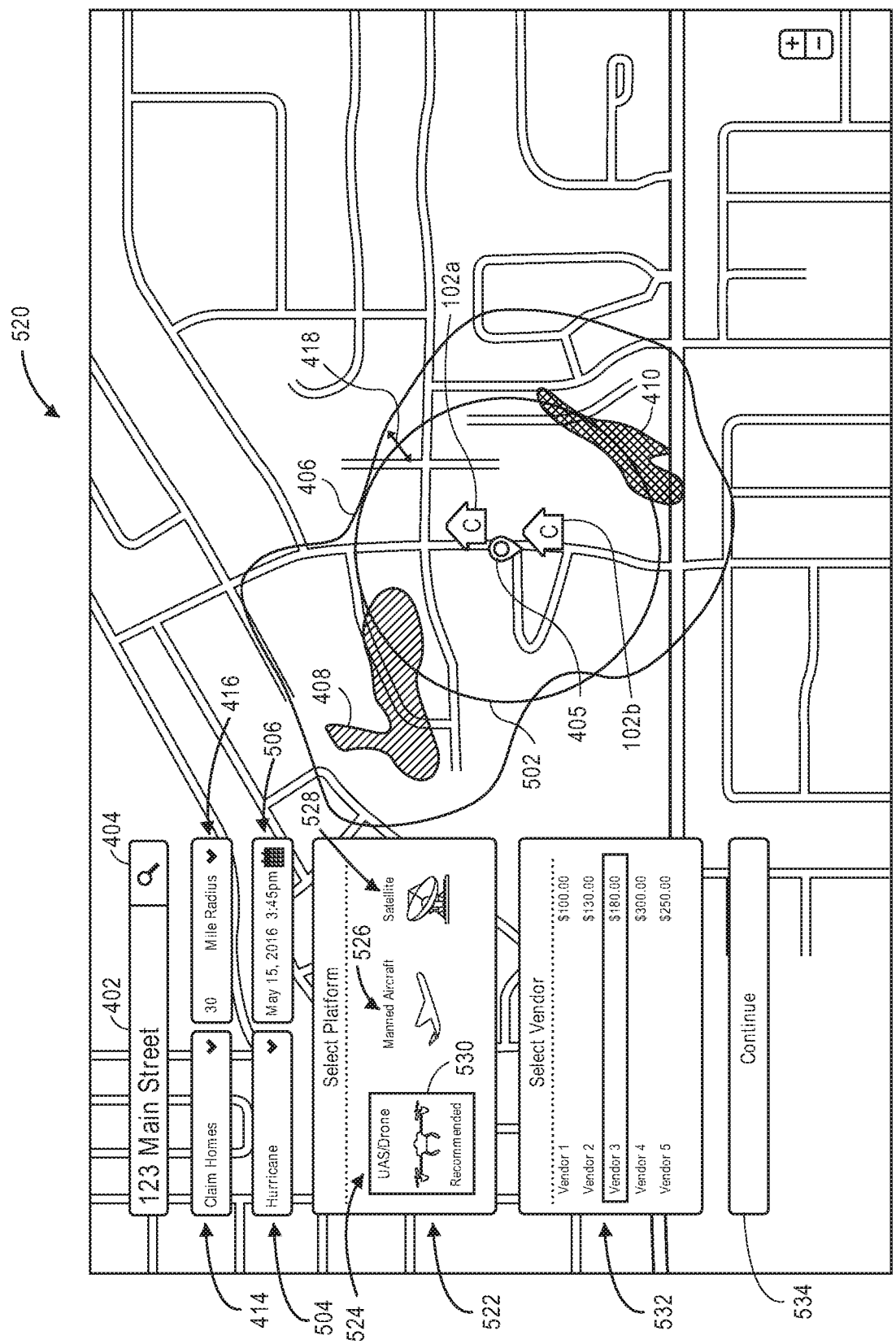
FIG. 5B illustrates another example user interface associated with providing data associated with insured losses.

With continued reference to the actions described with respect to block 354, and turning also to FIG. 5B, FIG. 5B illustrates another example user interface 520 associated with providing data associated with insured losses. As will be appreciated from the teaching and disclosure herein, the example user interface 520 may be a user interface generated from inputs via the example user interface 500. More particularly, the example user interface 520 may include the elements of the example user interface 500, and may further include a platform selection pane 522, which may include a first image 524 of a UAS (labeled "UAS/Drone"), a second image 526 of a manned aircraft, a third image 528 of a satellite, and a recommendation indicator 530. The example user interface 520 may also include a vendor selection pane 532 and a selection confirmation option 534, which is labeled "Continue" in the example of FIG. 5B. The platform selection pane 522 and components thereof, the vendor selection pane 532, and the selection confirmation option 534 may be displayed in response to user selection of the type of event and the time and date at which images are to be obtained as described with respect to FIG. 5A.

As shown in the example of FIG. 5B, the recommendation indicator 530 may include a rectangular pane enclosing the image of the recommended type of aerial platform (e.g., in FIG. 5B, enclosing the first image 524 of a UAS). The recommendation indicator 530 may also include a label of "Recommended" below the image of the recommended type of aerial platform (e.g., in FIG. 5B, below the first image 524 of a UAS). In some embodiments, a user may move the recommendation indicator 530 to a different type of aerial platform, and/or may otherwise select a type of aerial platform besides that indicated by the recommendation indicator 530 (e.g., by suitable user input). Moreover, as discussed above, in some embodiments, the aerial platform information server 114 may store and/or provide information regarding types of aerial platforms available to capture the image information, and/or may be used in determining the type of aerial platform to capture the image information (e.g., one or more processors of the aerial platform information server 114 may recommend and/or determine whether to receive the image information using a manned aircraft, satellite, or UAS). The vendor selection pane 532 may include a list of vendors and prices corresponding to the recommended type of aerial platform, and the selection confirmation option 534 may cause the one or more processors to place an order for deployment of the selected aerial platform to the region of interest 502 to capture the image data for receipt by the one or more processors.

The one or more processors may perform the actions described above with respect to block 306 to receive the image data from the at least one image capturing device 118. The one or more processors may process the image data to determine the indications of the respective conditions of each of the plurality of properties 102, as described with respect to block 308, including processing the image data to determine an indication (or indications) of a similarity of the image data to previous image data indicative of at least one previous property condition (block 356). The at least one previous property condition may be indicative of a property condition (e.g., of one of the plurality of properties 102 or of another property, such as another property not shown in the various user interfaces described herein) after a previously sustained insured loss. The previously sustained insured loss may, in various embodiments, be an insured loss sustained from the same event with respect to which the image data is received as described with respect to block 306 (and for which an indication of a condition of a corresponding property or properties has previously been determined), or an insured loss sustained from a different (e.g., previous) event.

The processing of the image data to determine an indication of a similarity of the image data to the previous image data may in some embodiments including utilizing a model developed from the previous image data. The model may indicate patterns, characteristics, etc. of the previous image data that correspond, for example, to particular levels of damage and/or conditions of property after an event such as a storm. The processing of the image data may thus include determining patterns, characteristics, etc. of the image data and the corresponding level(s) of damage and/or condition(s) of one or more properties as indicated by the model. It should be appreciated in light of the teaching and disclosure herein that any suitable technique for processing the image data, including any suitable technique for processing the image data to determine an indication of a similarity of the image data to previous image data as described, may be utilized. For example, the processing of the image data may utilize any suitable machine learning technique(s), such as deep learning.

Figure 6:
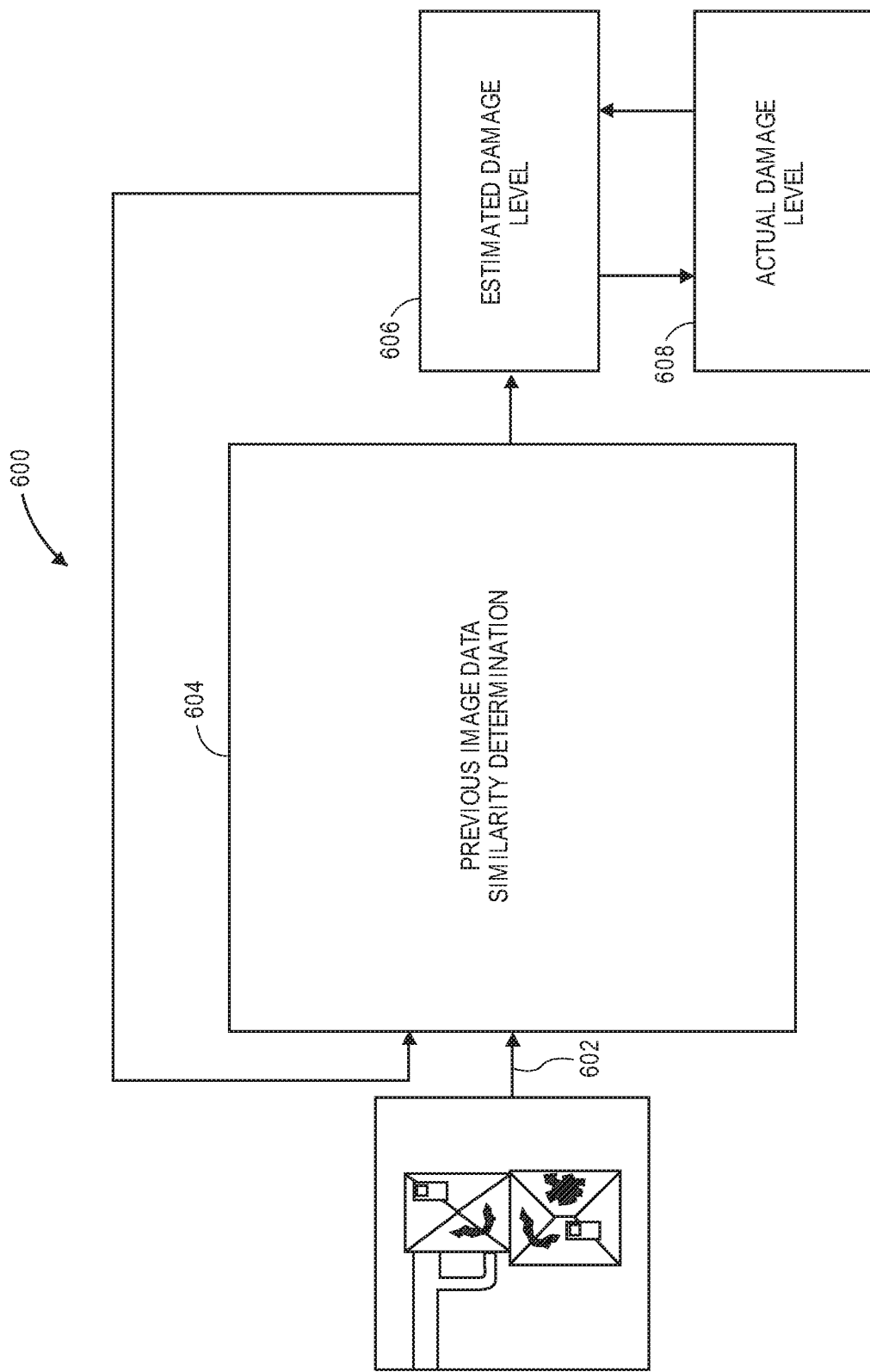
FIG. 6 is a functional block diagram of an example system for processing image data.

With continued reference to the actions described with respect to block 356, and turning also to FIG. 6, FIG. 6 is a functional block diagram of an example system 600 for processing image data. The example system 600 may include at least a portion of the image data as an input 602. For greater ease of understanding, FIG. 6 illustrates an overhead image of a property (e.g., one of the plurality of properties 102) coupled to the input 602, though it will be understood in light of the teaching and disclosure herein that the actual input 602 may be image data representative of the image shown in FIG. 6. The image data that constitutes the input 602 may be representative of an overhead image of a property that is centered on the property by using, for example, known information regarding a location of the property (e.g., address information, latitude and longitude information, etc.) to center the represented image on the property even when the property is significantly damaged or destroyed.

The example system 600 may include a previous image data similarity determination block 604 which receives the input 602. The previous image data similarity determination block 604 may be or may include, for example, any suitable computing device(s) to determine the similarity of the image data to the previous image data as described above. The output of the previous image data similarity determination block 604 may be any suitable data indicative of, for example, patterns, characteristics, etc. of the image data and the corresponding level(s) of damage and/or condition(s) of properties indicated by a model as described above. This output may be provided to an estimated damage level block 606, which may, for example, include any suitable computing device(s) to process the output of the previous image data similarity determination block 604 and generate data indicative of a damage level or condition of the property represented by the image data that constitutes the input 602. For example, the estimated damage level block 606 may perform any suitable actions to analyze the indicated patterns, characteristics, etc. of the image data and the corresponding level(s) of damage and/or condition(s) of properties to, for example, determine one of the three aforementioned damage levels corresponding to the property.

The determined damage level corresponding to the property may be provided to an actual damage level block 608. The actual damage level block 608 may be, for example, any suitable computing device(s) to which a user may provide input confirming or correcting the damage level determined by the estimated damage level block 606. A resulting indication of the actual damage level may be provided back to the estimated damage level block 606, and an output from the estimated damage level block 606 may be used to, for example, update a model (such as a model as discussed above) used by the previous image data similarity determination block 604 accordingly.

The one or more processors may perform the actions described with respect to block 310 to provide, via a user interface (e.g., one or more of the example user interfaces described herein), the data associated with the insured losses as discussed above. The one or more processors may receive data regarding a plurality of locations configured to accommodate one or more mobile response units of the insurance provider (block 358). For example, such data may be stored in data storage of the insurance provider, obtained from publicly available information such as publicly available map data, etc. As discussed above, such locations may be, for example, parking lots of large stores, parking lots of churches or schools, and/or any suitable locations for staging of a mobile response unit to deploy resources (e.g., representatives of the insurance provider) and/or serve as a point of information for insured parties in close proximity to the affected plurality of properties 102.

The one or more processors may determine one or more of the plurality of locations discussed with respect to block 358 to which to deploy or stage the one or more mobile response units based on at least one of the data regarding the plurality of locations discussed with respect to block 358, the data associated with the insured losses as discussed with respect to block 310, or a user input (block 360). As one example, a user may select one or more of the plurality of locations that may be indicated on a user interface (not shown) to be closest to the ones of the plurality of properties 102 having the first damage level (e.g., severity level one (1)) discussed above. As another example, a user may select any desired one or more of the plurality of locations.

The one or more processors may determine, based on the data associated with the insured losses as described with respect to block 310, at least one of a reserve setting associated with the event or data associated with dispatching of representatives of the insurance provider to at least one location associated with the event (block 362). For example, the data associated with dispatching of representatives to the at least one location may be data indicating that more representatives are to be dispatched to a location(s) having more properties with higher damage levels. With regard to the reserve setting, it should be appreciated that by advantageously obtaining the data associated with the insured losses as described with respect to block 310, even when accurate damage assessments may not be available from insured parties or affected areas may not be accessible by ground, and using such data as a basis for determining the reserve setting, the reserve setting may beneficially be determined much earlier in the process of responding to the event as compared to conventional responses. As such, appropriate resources may be more effectively deployed, among other advantages.

The one or more processors may provide, via an additional user interface (not shown) accessible by one or more agents of the insurance provider associated with one or more of the plurality of properties 102, at least a portion of the data associated with the insured losses (block 364). For example, the at least the portion of the data associated with the insured losses may be or may include the portion of the data associated with the insured losses that corresponds to the one or more of the plurality of properties 102 (e.g., the location(s) and condition(s) of each of the one or more of the plurality of properties 102, map data, the aforementioned enlarged view, etc.).

The one or more processors may cause, based on the data associated with the insured losses as described with respect to block 310, at least one of suitable information or funds to at least one of be provided to an insured party or be provided on behalf of an insured party (block 366). For example, the one or more processors may cause funds to be provided to an insured party (e.g., by electronic deposit or at a mobile response unit) associated with one of the plurality of properties 102 sustaining a respective insured loss(es) when, for example, the one of the plurality of properties 102 is temporarily or permanently uninhabitable as a result of its respective insured loss(es). Such funds may be in an amount based on a previously established policy amount, an amount of time during which the insured party needs living expenses to live in temporary housing such as a hotel, a cost the insured party will incur in moving to a new permanent property if the one of the plurality of properties 102 is permanently uninhabitable, and/or any other suitable criteria.

As another example, the one or more processors may additionally or alternatively cause funds to be provided on behalf of the insured party to a party other than the insured party (e.g., by electronic payment to the third party computing device 124) to pay for expenses incurred by the insured party, where the expenses are associated with the respective one or more insured loss(es). For example, such funds may be provided to a hotel that the insured party stays at while property of the insured party is uninhabitable when, for example, a debit and/or credit card(s) of the insured party are destroyed or misplaced as a result of the storm or other event.

As still another example, the one or more processors may additionally or alternatively cause information to be provided to the insured party regarding filing of an insurance claim associated with the respective one or more of the insured losses. Such information may include contact phone numbers, agent information, etc. As yet another example, the one or more processors may additionally or alternatively cause information to be provided to the insured party regarding a location of a mobile response unit deployed by the insurance provider in response to the event. As still another example, the one or more processors may additionally or alternatively cause information to be provided to the insured party, via an additional user interface (not shown) accessible by the insured party, regarding the respective condition of one of the plurality of properties 102 with which the insured party is associated after the property sustains one or more respective insured losses. Such information may be or may include, for example, the determined damage level of the property, map data, the aforementioned enlarged view, etc. For example, the insured party may view such information via a secure website (e.g., a website of the insurance provider) or in another suitable manner in order to confirm that the one of the plurality of properties 102 with which the insured party is associated (e.g., owns) is undamaged, to assess a degree of damage to the one of the plurality of properties 102 with which the insured party is associated, etc. The insured party may thereby plan and/or take subsequent actions (e.g., filing of an insurance claim and/or beginning a rebuilding process) accordingly.

It should be appreciated in light of the foregoing teaching and disclosure that the disclosed systems and methods provide various advantages over conventional techniques for monitoring and responding to an event such as a storm. For example, the event may be tracked at any desired stage, including before losses occur; the potential for damage may be more readily understood and communicated (e.g., by way of push notifications as described herein) to insured parties; actual damage may be readily assessed using image data captured from a suitably chosen aerial platform; and appropriate and accurate information may be provided to allow effective deployment of representatives, mobile response units, and other resources of the insurance provider. Such appropriate and accurate information may include information regarding locations of damaged properties and severity of damage, and may advantageously be obtained even when damaged areas are inaccessible and/or when insured parties are unable or not yet able to provide accurate reporting of damage to the insurance provider. As such, actions ranging from pre-event planning through post-event response are improved, and previous computer functionality facilitating such planning and response is itself improved, such as by determination of an appropriate aerial platform to use to obtain image data and by processing of the image data as described herein.

IV. Additional Considerations

The following additional considerations apply to the foregoing discussion. Throughout this specification, plural instances may implement functions, components, operations, or structures described as a single instance. As noted above, although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the insurance provider server 108, the plurality of insurance representative computing devices 120, and/or any other computing devices within the example system 100 in any suitable combination). The routines may be included as part of any of the modules described in relation to FIG. 1 or as part of a module that is external to the system illustrated by FIG. 1. For example, the methods or portions thereof may be part of a browser application(s) or an application(s) running on any of the devices in the example system 100 as a plug-in or other module of the browser application. Further, the methods may be employed as "software-as-a-service" to provide, for example, the insurance provider server 108, the plurality of insurance representative computing devices 120, and/or any other computing devices with access to the example system 100.

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict preferred embodiments of example systems, such as the example system 100 of FIG. 1, and methods for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and method for providing data associated with insured losses. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers To the extent that any meaning or definition of a term in this document conflicts with any meaning or definition of the same term in a document incorporated by reference, the meaning or definition assigned to that term in this document shall govern. Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A computer-implemented method for assessing damage to a plurality of properties, the method comprising:
   after an occurrence of an event that is a potential cause of insured losses, receiving, from an aerial platform via at least one network connection, image data (i) obtained by at least one image capturing device oriented on the aerial platform and (ii) depicting an aerial view of the plurality of properties;
   accessing previous image data depicting the plurality of properties, respectively, having a plurality of initial conditions prior to the occurrence of the event;
   processing, using one or more processors, the image data to determine, for each of the plurality of properties, a subsequent condition of the property after the occurrence of the event;
   based on processing the image data, identifying (i) a first portion of the plurality of properties each having the subsequent condition that is different from the initial condition, and (ii) a second portion of the plurality of properties each having the subsequent condition that is not different from the initial condition;
   based on processing the image data, determining, using the one or more processors, a damage severity level for each property in the first portion of the plurality of properties;
   displaying, in a graphical user interface, (i) a first set of indications corresponding to the first portion of the plurality of properties, and (ii) a second set of indications corresponding to the second portion of the plurality of properties; and
   processing, using the one or more processors, an insurance claim associated with a particular property of the plurality of properties based at least upon a damage severity level of the particular property.

2. The computer-implemented method of claim 1, wherein displaying the first set of indications comprises:
   displaying, in the graphical user interface, a set of labels indicating that each of the first portion of the plurality of properties sustained an insured loss from the event.

3. The computer-implemented method of claim 1, wherein displaying the second set of indications comprises:
   displaying, in the graphical user interface, a set of labels indicating that each of the second portion of the plurality of properties sustained an insured loss from a previous event.

4. The computer-implemented method of claim 1, wherein displaying the second set of indications comprises:
   displaying, in the graphical user interface, a set of labels indicating that each of the second portion of the plurality of properties did not have an insured loss detected or reported.

5. The computer-implemented method of claim 1, further comprising:
   displaying, in the graphical user interface, a table of the first portion of the plurality of properties, the table listing, for each property in the first portion of the plurality of properties, an address and the damage severity level.

6. The computer-implemented method of claim 1, further comprising:
   displaying, in the graphical user interface, (i) a first weather area in which the first set of indications corresponding to the first portion of the plurality of properties is displayed, and (ii) a second weather area in which the second set of indications corresponding to the second portion of the plurality of properties is displayed.

7. A system for assessing damage to a plurality of properties, comprising:
   a user interface;
   a transceiver configured to connect to an aerial platform via at least one network connection;
   a memory storing a set of computer-executable instructions and previous image data; and
   a processor interfacing with the user interface, the transceiver, and the memory, and configured to execute the computer-executable instructions to cause the processor to:
   after an occurrence of an event that is a potential cause of insured losses, receive, from the aerial platform via the transceiver, image data (i) obtained by at least one image capturing device oriented on the aerial platform and (ii) depicting an aerial view of the plurality of properties,
   access, from the memory, the previous image data depicting the plurality of properties, respectively, having a plurality of initial conditions prior to the occurrence of the event,
   process the image data to determine, for each of the plurality of properties, a subsequent condition of the property after the occurrence of the event,
   based on processing the image data, identify (i) a first portion of the plurality of properties each having the subsequent condition that is different from the initial condition, and (ii) a second portion of the plurality of properties each having the subsequent condition that is not different from the initial condition,
   based on processing the image data, determine a damage severity level for each property in the first portion of the plurality of properties,
   cause the user interface to display (i) a first set of indications corresponding to the first portion of the plurality of properties, and (ii) a second set of indications corresponding to the second portion of the plurality of properties, and process an insurance claim associated with a particular property of the plurality of properties based at least upon a damage severity level of the particular property.

8. The system of claim 7, wherein to cause the user interface to display the first set of indications, the processor is configured to:

cause the user interface to display a set of labels indicating that each of the first portion of the plurality of properties sustained an insured loss from the event.

9. The system of claim 7, wherein to cause the user interface to display the second set of indications comprises:

cause the user interface to display a set of labels indicating that each of the second portion of the plurality of properties sustained an insured loss from a previous event.

10. The system of claim 7, wherein to cause the user interface to display the second set of indications, the processor is configured to:

cause the user interface to display a set of labels indicating that each of the second portion of the plurality of properties did not have an insured loss detected or reported.

11. The system of claim 7, wherein the processor is further configured to:

cause the user interface to display a table of the first portion of the plurality of properties, the table listing, for each property in the first portion of the plurality of properties, an address and the damage severity level.

12. The system of claim 7, wherein the processor is further configured to:

cause the user interface to display (i) a first weather area in which the first set of indications corresponding to the first portion of the plurality of properties is displayed, and (ii) a second weather area in which the second set of indications corresponding to the second portion of the plurality of properties is displayed.

13. A non-transitory computer-readable storage medium having stored thereon a set of instructions, executable by a processor, for assessing damage to a plurality of properties, the instructions comprising:

instructions for, after an occurrence of an event that is a potential cause of insured losses, receiving, from an aerial platform via at least one network connection, image data (i) obtained by at least one image capturing device oriented on the aerial platform and (ii) depicting an aerial view of the plurality of properties;

instructions for accessing previous image data depicting the plurality of properties, respectively, having a plurality of initial conditions prior to the occurrence of the event;

instructions for processing the image data to determine, for each of the plurality of properties, a subsequent condition of the property after the occurrence of the event;

instructions for, based on processing the image data, identifying (i) a first portion of the plurality of properties each having the subsequent condition that is different from the initial condition, and (ii) a second portion of the plurality of properties each having the subsequent condition that is not different from the initial condition;

instructions for, based on processing the image data, determining a damage severity level for each property in the first portion of the plurality of properties;

instructions for displaying, in a graphical user interface, (i) a first set of indications corresponding to the first portion of the plurality of properties, and (ii) a second set of indications corresponding to the second portion of the plurality of properties; and instructions for processing an insurance claim associated with a particular property of the plurality of properties based at least upon a damage severity level of the particular property.

14. The non-transitory computer-readable storage medium of claim 13, wherein the instructions for displaying the first set of indications comprise:

instructions for displaying, in the graphical user interface, a set of labels indicating that each of the first portion of the plurality of properties sustained an insured loss from the event.

15. The non-transitory computer-readable storage medium of claim 13, wherein the instructions for displaying the second set of indications comprise:

instructions for displaying, in the graphical user interface, a set of labels indicating that each of the second portion of the plurality of properties sustained an insured loss from a previous event.

16. The non-transitory computer-readable storage medium of claim 13, wherein the instructions for displaying the second set of indications comprise:

instructions for displaying, in the graphical user interface, a set of labels indicating that each of the second portion of the plurality of properties did not have an insured loss detected or reported.

17. The non-transitory computer-readable storage medium of claim 13, further comprising:

instructions for displaying, in the graphical user interface, a table of the first portion of the plurality of properties, the table listing, for each property in the first portion of the plurality of properties, an address and the damage severity level.

* * * * *